US006237000B1

(12) United States Patent
Dahlen et al.

(10) Patent No.: US 6,237,000 B1
(45) Date of Patent: May 22, 2001

(54) METHOD AND APPARATUS FOR PREVIEWING THE RESULTS OF A DATA STRUCTURE ALLOCATION

(75) Inventors: Dennis J. Dahlen, Rhinebeck, NY (US); David A. Elko, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/071,555

(22) Filed: May 1, 1998

(51) Int. Cl.[7] .................................................. G06F 17/30
(52) U.S. Cl. ........................ 707/100; 707/200; 707/205
(58) Field of Search ................................ 707/204, 1, 100, 707/200, 205; 709/5

(56) References Cited

U.S. PATENT DOCUMENTS

| 5,265,193 | 11/1993 | Grady et al. ............................ 395/64 |
| 5,317,739 | 5/1994 | Elko et al. ............................. 395/650 |
| 5,331,673 | 7/1994 | Elko et al. ............................. 395/575 |
| 5,339,405 | 8/1994 | Elko et al. ............................. 395/575 |
| 5,339,427 | 8/1994 | Elko et al. ............................. 395/725 |
| 5,369,749 | 11/1994 | Baker et al. ........................... 395/325 |
| 5,388,266 | 2/1995 | Frey et al. ............................. 395/700 |
| 5,390,328 | 2/1995 | Frey et al. ............................. 395/650 |
| 5,392,397 | 2/1995 | Elko et al. ............................. 395/200 |
| 5,394,542 | 2/1995 | Frey et al. ............................. 395/575 |
| 5,394,554 | 2/1995 | Elko et al. ............................. 395/800 |
| 5,404,500 | 4/1995 | Logvold et al. ....................... 395/575 |
| 5,410,695 | 4/1995 | Frey et al. ............................. 395/650 |
| 5,450,590 | 9/1995 | Elko et al. ............................. 395/700 |
| 5,457,793 | 10/1995 | Elko et al. ............................. 395/600 |
| 5,463,736 | 10/1995 | Elko et al. ............................. 395/848 |
| 5,465,359 | 11/1995 | Allen et al. ........................... 395/700 |
| 5,493,668 | 2/1996 | Elko et al. ............................. 395/457 |
| 5,515,499 | 5/1996 | Allen et al. ........................... 395/182 |
| 5,537,574 | 7/1996 | Elko et al. ............................. 395/468 |
| 5,544,345 | 8/1996 | Carpenter et al. .................... 395/477 |
| 5,561,809 | 10/1996 | Elko et al. ............................. 395/800 |
| 5,581,737 | 12/1996 | Dahlen et al. ......................... 395/497 |

(List continued on next page.)

OTHER PUBLICATIONS

IBM Technical Disclosure Bulletin, vol. 37, No. 06A, 6/94 "Test Facility For Netview Applications" pp. 587–589.

IBM Systems Journal, vol. 36, No. 2, 1997,S/390 Cluster Technology: Parallel Sysplex by J. M. Nick et al, pp. 172–201.

*Primary Examiner*—John Breene
*Assistant Examiner*—Cheryl Lewis
(74) *Attorney, Agent, or Firm*—William A. Kinnaman, Jr.

(57) ABSTRACT

A method and apparatus for previewing the results of the allocation of a data structure, such as a cache or list structure, in an information handling system in which a coupling facility (CF) is operable to allocate a data structure in accordance with parameters contained in a message command block (MCB) received from a central processing complex (CPC). The data structure is defined by a set of independent parameter values that also have a set of one or more dependent parameter values that are dependent on the independent parameter values. Upon receiving an MCB containing a set of one or more independent parameter values defining a data structure, the CF determines, without actually allocating a data structure, the dependent parameter values of a data structure defined by the independent parameter values and returns a message response block (MRB) containing the dependent parameter values. In one mode of operation, the CF receives a target structure size as an independent parameter value and returns target entry and element counts as dependent parameter values. In another mode of operation, the CF receives target entry and element counts as independent parameter values and returns a target structure size as a dependent parameter value.

20 Claims, 15 Drawing Sheets

U.S. PATENT DOCUMENTS

| | | | |
|---|---|---|---|
| 5,604,863 | 2/1997 | Allen et al. | 395/182 |
| 5,630,050 | 5/1997 | Neuhard et al. | 395/183 |
| 5,634,072 | 5/1997 | Allen et al. | 395/674 |
| 5,664,155 | 9/1997 | Elko | 711/170 |
| 5,742,830 | 4/1998 | Elko et al. | 395/728 |
| 5,761,646 * | 6/1998 | Frid-Nielsen et al. | 705/9 |
| 5,778,395 * | 7/1998 | Whiting et al. | 707/204 |
| 5,794,217 * | 8/1998 | Allen | 705/27 |
| 5,903,905 * | 5/1999 | Andersen et al. | 707/526 |
| 5,905,994 * | 5/1999 | Hori et al. | 711/113 |
| 5,920,873 * | 7/1999 | Van Huben et al. | 707/204 |
| 5,953,729 * | 9/1999 | Cabrera et al. | 707/204 |

* cited by examiner

CACHE-STRUCTURE CONTROLS

| | |
|---|---|
| TOTAL-DIRECTORY-ENTRY COUNT | (TDEC) |
| TOTAL-DATA-AREA-ELEMENT COUNT | (TDAEC) |
| ADJUNCT-ASSIGNMENT INDICATOR | (AAI) |
| MAXIMUM STORAGE CLASS | (MSC) |
| MAXIMUM CAST-OUT CLASS | (MCC) |
| DATA-AREA-ELEMENT CHARACTERISTIC | (DAEX) |
| MAXIMUM DATA-AREA SIZE | (MDAS) |
| STRUCTURE SIZE | (SS) |
| MAXIMUM STRUCTURE SIZE | (MXSS) |
| MINIMUM APPORTIONABLE STRUCTURE SIZE | (MASS) |
| MARGINAL STRUCTURE SIZE | (MRSS) |
| STRUCTURE AUTHORITY | (SAU) |
| USER STRUCTURE CONTROL | (USC) |
| LCID VECTOR | (LCIDV) |

DIRECTORY INFORMATION BLOCK

72

| | |
|---|---|
| NAME | (N) | ~78
| USER-DATA FIELD | (UDF) |
| STORAGE CLASS | (SC) |
| CHANGE INDICATOR | (C) |
| DATA-CACHED INDICATOR | (D) |
| CAST-OUT-PARITY-BITS INDICATOR | (CP) |
| CAST-OUT CLASS | (CC) |
| CAST-OUT-LOCK VALUE | (CLV) |
| DATA-AREA SIZE | (DAS) | ~80
| LOCAL-CACHE IDENTIFIER | (LCID) |
| LCEN-VALIDITY INDICATOR | (LVI) |
| LOCAL-CACHE ENTRY NUMBER | (LCEN) | ~82

LIST-STRUCTURE CONTROLS

| | |
|---|---|
| MAXIMUM DATA-LIST-ENTRY SIZE | (MDLES) |
| LIST-STRUCTURE TYPE | (LST) |
| LOCK-TABLE-ENTRY CHARACTERISTIC | (LTEX) |
| LIST-ELEMENT CHARACTERISTIC | (LELX) |
| MINIMUM APPORTIONABLE STRUCTURE SIZE | (MASS) |
| MARGINAL STRUCTURE SIZE | (MRSS) |
| LOCK-TABLE-ENTRY COUNT | (LTEC) |
| LIST COUNT | (LC) |
| STRUCTURE SIZE | (SS) |
| MAXIMUM STRUCTURE SIZE | (MXSS) |
| MAXIMUM LIST-SET-ELEMENT COUNT | (MLSELC) |
| LIST-SET-ELEMENT COUNT | (LSELC) |
| NON-ZERO-LOCK-TABLE-ENTRY COUNT | (NLTEC) |
| MAXIMUM LIST-SET-ENTRY COUNT | (MLSEC) |
| LIST-SET-ENTRY COUNT | (LSEC) |
| STRUCTURE AUTHORITY | (SAU) |
| USER STRUCTURE CONTROL | (USC) |
| USER-IDENTIFIER VECTOR | (UIDV) |

LIST-USER CONTROL BLOCK (LUCB)

| | |
|---|---|
| USER IDENTIFIER | (UID) |
| USER STATE | (US) |
| LIST-NOTIFICATION TOKEN | (LNT) |
| USER AUTHORITY | (UAU) |
| SYSTEM IDENTIFIER | (SYID) |
| USER-ATTACHMENT CONTROL | (UAC) |
| DETACHMENT RESTART TOKEN | (DRT) |

LIST ENTRY CONTROL BLOCK (LECB)

| | |
|---|---|
| DATA-LIST-ENTRY SIZE | (DLES) |
| LIST NUMBER | (LN) |
| LIST-ENTRY IDENTIFIER | (LEID) |
| VERSION NUMBER | (VN) |
| LIST-ENTRY KEY | (LEK) |
| LIST-ENTRY NAME | (LEN) |

102

LIST CONTROLS

| | |
|---|---|
| LIST-ENTRY-COUNT LIMIT | (LECL) |
| LIST-ENTRY-COUNT | (LEC) |
| LIST-STATE-TRANSITION COUNT | (LSTC) |
| LIST AUTHORITY | (LAU) |
| USER LIST CONTROLS | (ULC) |
| LIST-MONITOR-TABLE ENTRY 0 | |
|     LIST-MONITORING-ACTIVE BIT | (LMAB) |
|     LIST-NOTIFICATION-REQUEST TYPE | (LNRT) |
|     LIST-NOTIFICATION-ENTRY NUMBER | (LNEN) |
| LIST-MONITOR-TABLE ENTRY 1 | |
|     LIST-MONITORING-ACTIVE | |
|     LIST-NOTIFICATION-REQUEST TYPE | |
|     LIST-NOTIFICATION-ENTRY NUMBER | |
| • • • | |
| LIST-MONITOR-TABLE ENTRY n | |
|     LIST-MONITORING-ACTIVE | |
|     LIST-NOTIFICATION-REQUEST TYPE | |
|     LIST-NOTIFICATION-ENTRY NUMBER | |

FIG.10

REQUEST/RESPONSE OPERANDS

| | |
|---|---|
| ATTACHMENT INFORMATION | (AINF) |
| COMPARATIVE LOCAL-CACHE AUTHORITY | (CLCAU) |
| COMPARATIVE STRUCTURE AUTHORITY | (CSAU) |
| COMPARATIVE USER AUTHORITY | (CUAU) |
| DETACHMENT-REQUEST TYPE | (DRT) |
| LIST-MONITORING-ACTIVE BIT | (LMAB) |
| LIST-NOTIFICATION-ENTRY NUMBER | (LNEN) |
| LIST-NOTIFICATION-TOKEN | (LNT) |
| LCID-UNASSIGNMENT CONTROL | (LUC) |
| LOCAL-CACHE AUTHORITY | (LCAU) |
| LOCAL-CACHE-ENTRY NUMBER | (LCEN) |
| LOCAL-CACHE IDENTIFIER | (LCID) |
| LOCAL-CACHE TOKEN | (LCT) |
| STRUCTURE AUTHORITY | (SAU) |
| USER-ATTACHMENT CONTROL | (UAC) |
| USER AUTHORITY | (UAU) |
| USER IDENTIFIER | (UID) |
| USER STATE | (US) |
| USER STRUCTURE CONTROL | (USC) |
| ALLOCATION TYPE | (AT) |

FIG.13

METHOD AND APPARATUS FOR PREVIEWING THE RESULTS OF A DATA STRUCTURE ALLOCATION

BACKGROUND OF THE INVENTION

1. Field of the Invention

The invention relates to method and apparatus for previewing the results of a data structure allocation in an information handling system and, more particularly, to a method and apparatus for previewing the results of an allocation of a cache or list structure in such an information handling system.

2. Description of the Related Art

The S/390 Parallel Sysplex configuration is a cluster of interconnected processing nodes with attachments to shared storage devices, network controllers, and core cluster technology components, consisting of coupling facilities, coupling support facilities, and sysplex timers. A coupling facility (CF) enables high-performance read/write sharing of data by applications running on each node of the cluster through global locking and cache coherency management mechanisms. It also provides cluster-wide queuing mechanisms for workload distribution and message passing between nodes.

The coupling facility is described in the following patents and publications, incorporated herein by reference:

"In a Multiprocessing System Having a Coupling Facility, Communicating Messages between the Processors and the Coupling Facility in Either a Synchronous Operation or an Asynchronous Operation", by D. A. Elko et al., Ser. No. 08/420,893, filed Apr. 11, 1995, now U.S. Pat. No. 5,561,809;

"Sysplex Shared Data Coherency Method And Means," by D. A. Elko et al., Ser. No. 07/860,805, filed Mar. 30, 1992, now U.S. Pat. No. 5,537,574;

"Method And Apparatus For Distributed Locking Of Shared Data, Employing A Central Coupling Facility," by D. A. Elko et al., Ser. No. 07/860,808, filed Mar. 30, 1992, now U.S. Pat. No. 5,339,427;

"Command Quiesce Function," by D. A. Elko et al., Ser. No. 07/860,330, filed Mar. 30, 1992, now U.S. Pat. No. 5,339,405;

"Software Cache Management Of A Shared Electronic Store In A Sysplex," by D. A. Elko et al., Ser. No. 07/860,807, filed Mar. 30, 1992, now U.S. Pat. No. 5,457,793;

"Multiple Processor System Having Software For Selecting "Shared Cache Entries Of An Associated Castout Class For Transfer To A DASD With One I/O Operation," by D. A. Elko et al, Ser. No. 07/860,806, filed Mar. 30, 1992, now U.S. Pat. No. 5,493,668;

"Command Execution System For Using First And Second Commands To Reserve And Store Second Command Related Status Information In Memory Portion Respectively," by D. A. Elko et al., Ser. No. 07/860,378, filed Mar. 30, 1992, now U.S. Pat. No. 5,392,397;

"Integrity Of Data Objects Used To Maintain State Information For Shared Data At A Local Complex," by D. A. Elko et al, Ser. No. 07/860,800, filed Mar. 30, 1992, now U.S. Pat. No. 5,331,673;

"Management Of Data Objects Used To Maintain State Information For Shared Data At A Local Complex," by J. A. Frey et al, Ser. No. 07/860,797, filed Mar. 30, 1992, now U.S. Pat. No. 5,388,266;

"Clearing Data Objects Used To Maintain State Information For Shared Data At A Local Complex When At Least One Message Path To The Local Complex Cannot Be Recovered," by J. A. Frey et al., Ser. No. 07/860,647, filed Mar. 30, 1992, now U.S. Pat. No. 5,394,542;

"Coupling Facility For Receiving Commands From Plurality Of Hosts For Activating Selected Connection Paths To I/O Devices And Maintaining Status Thereof," by D. A. Elko et al., Ser. No. 08/324,447, filed Oct. 18, 1994, now U.S. Pat. No. 5,463,736;

"Data Processing System And Method For Providing Notification In A Central Processor Of State Changes For Shared Data Structure On External Storage," by J. A. Frey et al., Ser. No. 07/860,809, filed Mar. 30, 1992, now U.S. Pat. No. 5,390,328;

"Method And Apparatus For Performing Conditional Operations On Externally Shared Data," by J. A. Frey et al., Ser. No. 08/383,532, filed Feb. 1, 1995, now U.S. Pat. No. 5,742,830;

"Apparatus And Method For List Management In A Coupled Data Processing System," by J. A. Frey et al., Ser. No. 07/860,633, filed Mar. 30, 1992, now U.S. Pat. No. 5,410,695;

"Interdicting I/O And Messaging Operations In A Multi-System Complex," by D. A. Elko et al., Ser. No. 07/860,489, filed Mar. 30, 1992, now U.S. Pat. No. 5,394,554;

"Method And Apparatus For Coupling Data Processing Systems," by D. A. Elko et al., Ser. No. 07/860,803, filed Mar. 30, 1992, now U.S. Pat. No. 5,317,739;

"Authorization Method For Conditional Command Execution," by D. A. Elko et al., Ser. No. 08/408,446, filed Mar. 22, 1995, now U.S. Pat. No. 5,450,590;

"Dynamically Assigning a Dump Space in a Shared Data Facility to Receive Dumping Information to be Captured," by D. A. Elko et al., Ser. No. 08/471,895, filed Jun. 7, 1995, now U.S. Pat. No. 5,664,155;

"Method And System For Capturing and Controlling Access To Information In A Coupling Facility," by D. E. Neuhard et al., Ser. No. 08/146,647, filed Nov. 1, 1993, now U.S. Pat. No. 5,630,050;

"Method and Apparatus for Expansion, Contraction, and Reapportionment of Structured External Storage Structures", by D. J. Dahlen et al., Ser. No. 08/304,458, filed Sep. 12, 1994, now U.S. Pat. No. 5,581,737;

"Method of Managing Resources in One or More Coupling Facilities Coupled to One or More Operating Systems in One or More Central Programming Complexes Using a Policy," by R. A. Allen et al., Ser. No. 08/607,053, filed Feb. 26, 1996, now U.S. Pat. No. 5,634,072;

"Method and System for Managing Data and Users of Data in a Data Processing System," by R. A. Allen, Ser. No. 08/146,727, filed Nov. 1, 1993, now U.S. Pat. No. 5,465,359;

"Method and System for Reconfiguring a Storage Structure Within a Structure Processing Facility," by R. A. Allen et al., Ser. No. 08/544,941, filed Oct. 18, 1995, now U.S. Pat. No. 5,515,499;

"Method for Coordinating Executing Programs in a Data Processing System," by R. A. Allen et al., Ser. No. 08/439,269, filed May 9, 1995, now U.S. Pat. No. 5,604,863;

"Coherence Controls for Store-Multiple Shared Data Coordinated by Cache Directory Entries in a Shared Electronic Storage," by K. S. Carpenter et al., Ser. No. 08/148,707, filed Nov. 8, 1993, now U.S. Pat. No. 5,544,345; and J. M. Nick et al., "S/390 cluster technology: Parallel Sysplex", *IBM Systems Journal*, vol. 36, no. 2, 1997, pages 172–201.

Currently, users of the Coupling Facility must be provided with formulas that enable them to determine what target structure size to use in order to obtain a desired number of entries and elements in a list or cache structure. Additional formulas are provided to enable them to compute the number of entries and elements that will result when a structure is allocated with a given structure size.

The formulas that are currently provided have two problems: (1) they yield results that are only approximate, and (2) the formulas have to be updated as changes are made to the CF architecture and implementation. The approximate nature of the results yielded by the formulas has been a source of trouble, since some users prefer a bias in one direction while other users prefer a bias in the other direction. In addition to being time-consuming, updates to the formulas can cause trouble when a user fails to obtain the version of the formulas appropriate to the level of the CF he is working with.

SUMMARY OF THE INVENTION

In general, the present invention contemplates a method and apparatus for previewing the results of the allocation of a data structure (such as a cache or list structure) in an information handling system in which a request handler (such as a coupling facility) is operable to allocate a data structure in accordance with parameters contained in a request received from a requester such as a central processing complex (CPC). The data structure is defined by a set of independent parameter values that also have a set of one or more dependent parameter values that are dependent on the independent parameter values. Upon receiving an MCB containing a set of one or more independent parameter values defining a data structure, the CF determines, without actually allocating a data structure, the dependent parameter values of a data structure defined by the independent parameter values and returns a message response block (MRB) containing the dependent parameter values. In one mode of operation, the CF receives a target structure size as an independent parameter value and returns target entry and element counts as dependent parameter values. In another mode of operation, the CF receives target entry and element counts as independent parameter values and returns a target structure size as a dependent parameter value.

More particularly, the present invention contemplates two new commands in the CF architecture: a Compute List Structure Parameters (CLSP) command for the list model and a Compute Cache Structure Parameters (CCSP) command for the cache model. These commands are similar to the existing Allocate List Structure (ALST) and Allocate Cache Structure (ACS) commands. But instead of actually proceeding with the allocation of a list or cache structure, they merely return results indicating what would happen if a list or cache structure were to be allocated with the specified properties.

Specifically, if the user wants to know what target structure size he needs to submit to obtain a structure with a particular number of entries and elements, he issues the new command with those entry and element counts and the rest of the information needed to describe the attributes of the desired structure (the size of the data elements, the size of the lock table entries, the number of lock table entries, the number of lists, and so forth). The CF responds with an MRB that contains the required TSS value, the target ratio (s), and the associated maximum entry and element counts (which will be equal to or greater than the entry and element counts submitted in the associated MCB).

Or, if the user wants to know what entry and element counts will result when he creates a structure with a particular target structure size, he issues the new command with that target structure size and the rest of the information needed to describe the attributes of the desired structure. The CF responds with an MRB that contains the maximum entry and element counts for the given TSS.

When the user then proceeds with the allocation, the results will be exactly as predicted by the "test allocation" function. The approximate results obtained by using the existing formulas will be a thing of the past; and there will be no possibility of using a set of formulas that are out of step with the implementation.

The "test allocation" described here solves both of the problems mentioned in the background portion above: the results will be exact; and the commands will be updated with each new release and will accompany the rest of the code, allowing no possibility for a mismatch between formulas and actual behavior.

BRIEF DESCRIPTION OF THE INVENTION

FIG. 4 depicts one example of the controls associated with a cache structure.

FIG. 5 depicts one example of a local cache control block associated with each local cache of the data processing system depicted in FIG. 1.

FIG. 6 depicts one embodiment of a directory information block in connection with the directory depicted in FIG. 3.

FIG. 8 depicts one example of the controls associated with the list structure of FIG. 7.

FIG. 9 depicts one embodiment of a list-user control block.

FIG. 10 depicts one example of the controls associated with a list within the list structure of FIG. 7.

FIG. 11 illustrates one example of a list entry control block.

FIG. 13 depicts one embodiment of request/response operands.

Figure 14A:
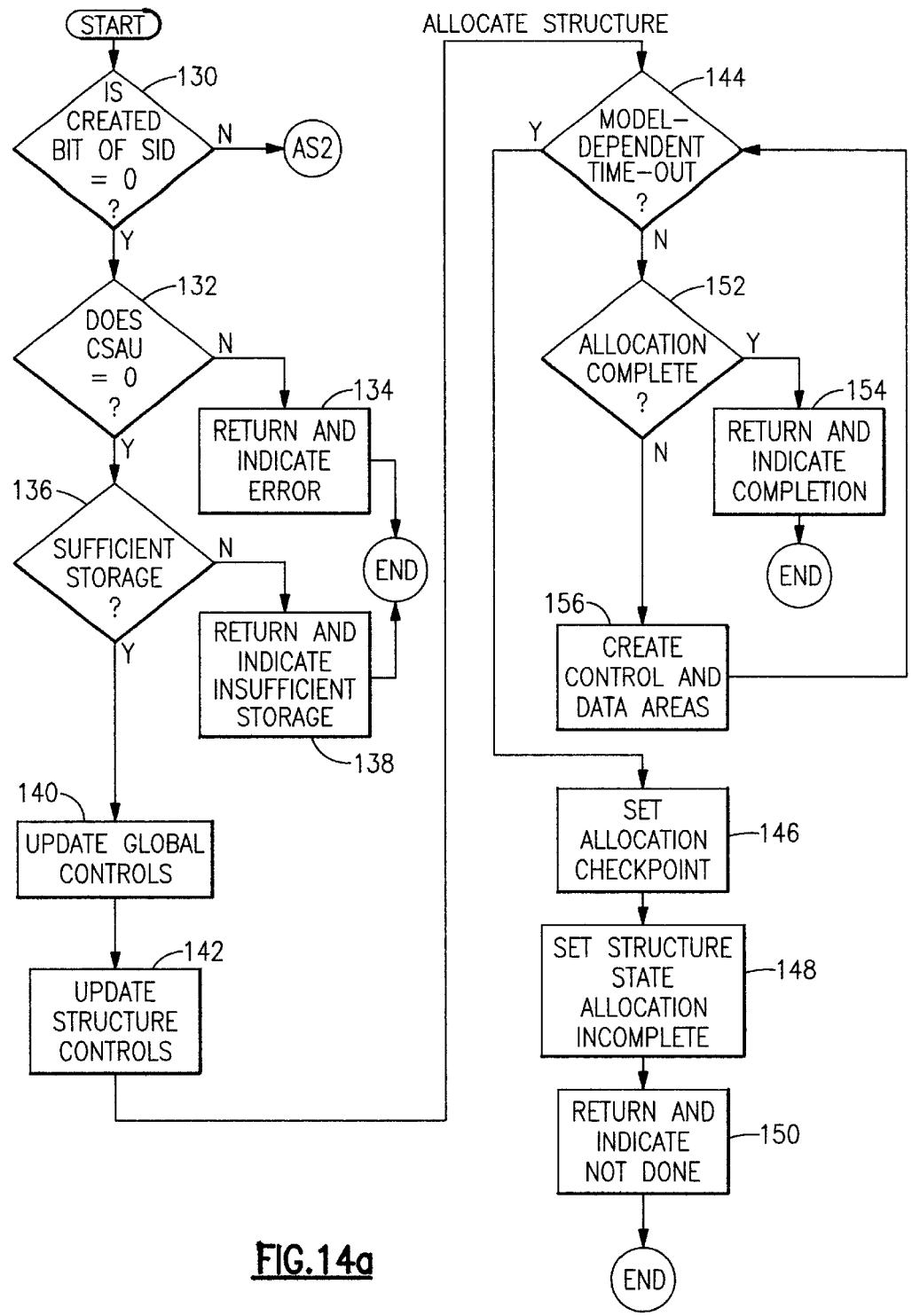
Figure 14B:
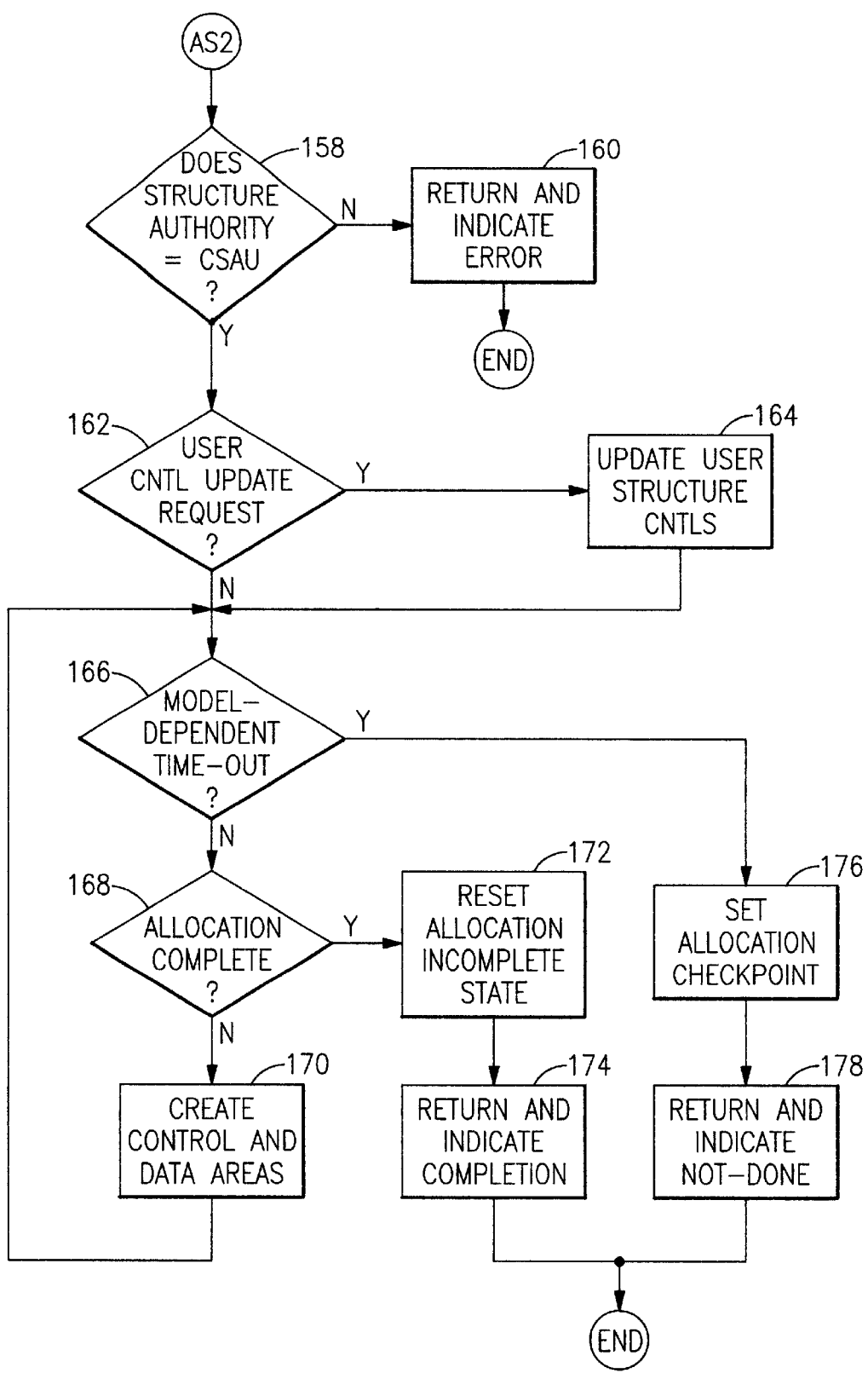

FIGS. 14*a*, 14*b* depict one embodiment of the logic associated with an allocate structure command.

Figure 15:
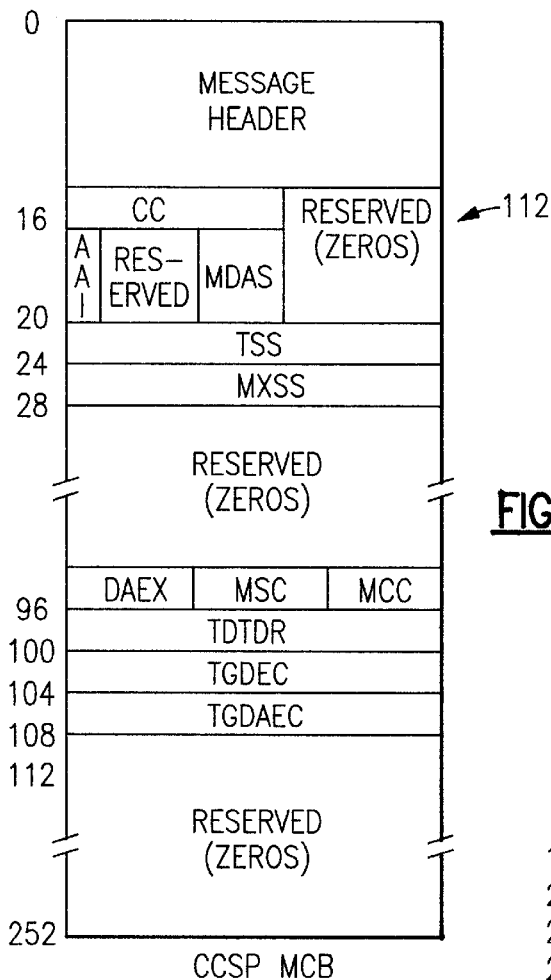

FIG. 15 shows the message command block (MCB) format for a Compute Cache Structure Parameters (CCSP) command.

Figure 16:
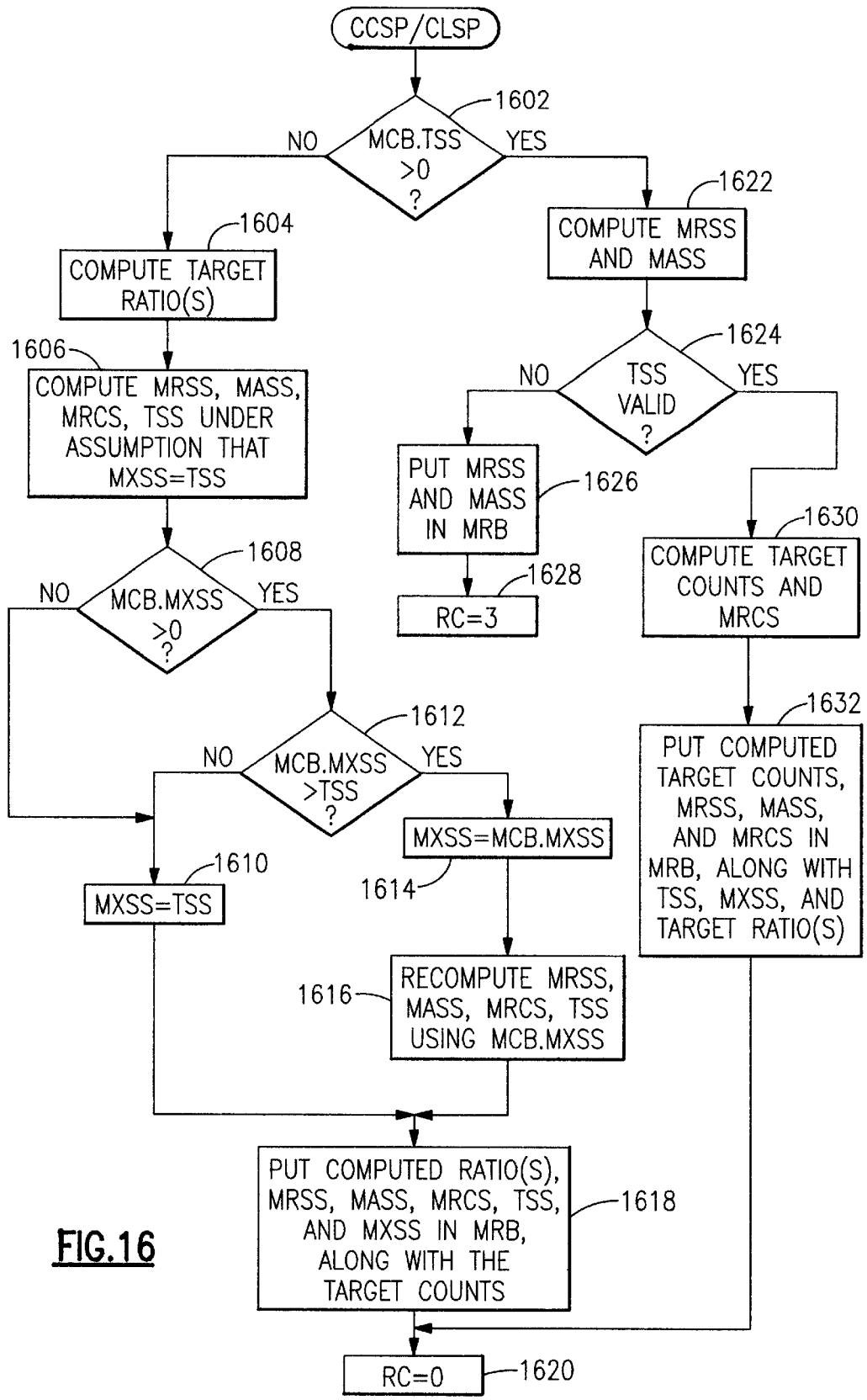

FIG. 16 shows the processing of a Compute Cache Structure Parameters (CCSP) or Compute List Structure Parameters (CLSP) command.

Figure 17:
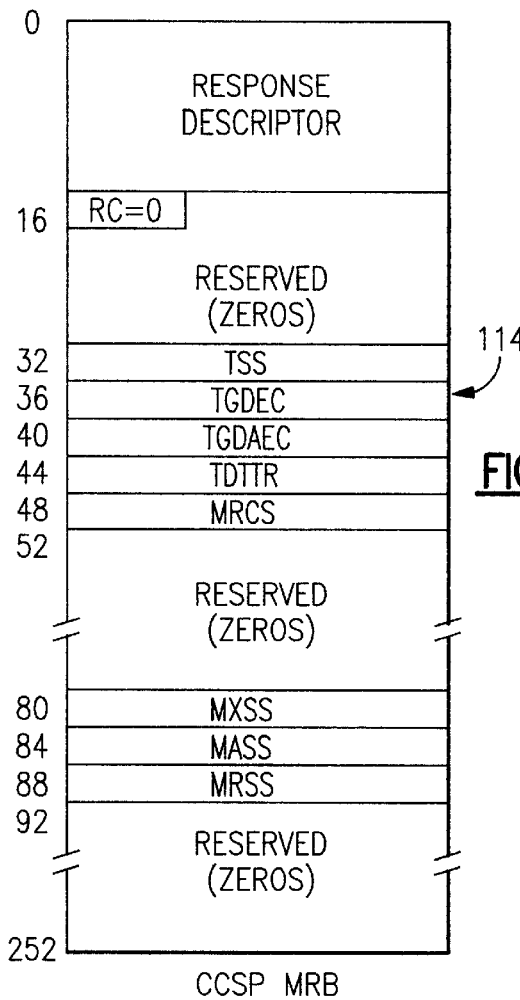

FIG. 17 shows the message response block (MRB) format for a Compute Cache Structure Parameters (CCSP) command when the response code (RC) is 0.

Figure 18:
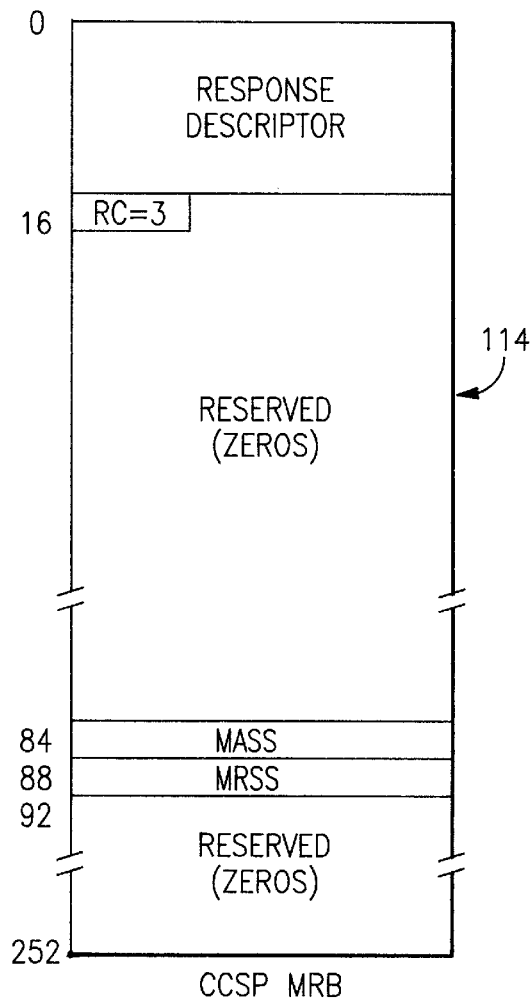

FIG. 18 shows the message response block (MRB) format for a Compute Cache Structure Parameters (CCSP) command when the response code (RC) is 3.

Figure 19:
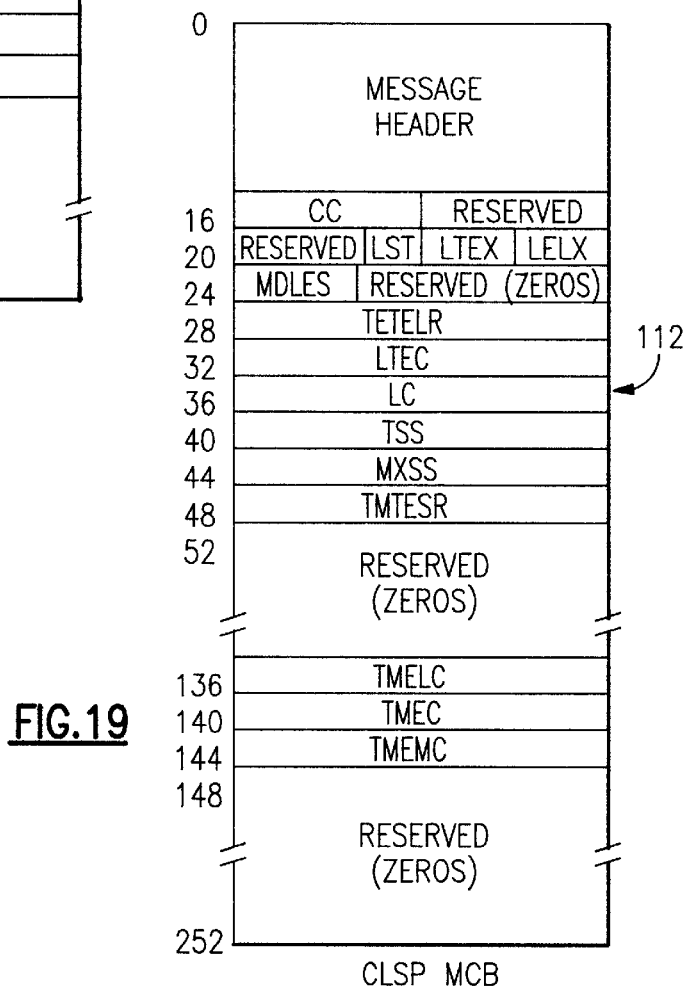

FIG. 19 shows the message command block (MCB) format for a Compute List Structure Parameters (CLSP) command.

Figure 20:
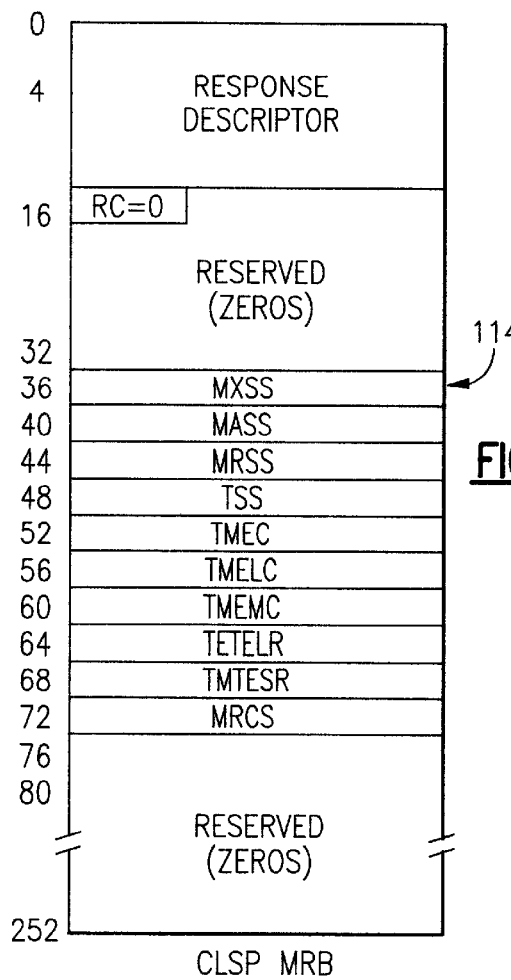

FIG. 20 shows the message response block (MRB) format for a Compute List Structure Parameters (CLSP) command when the response code (RC) is 0.

Figure 21:
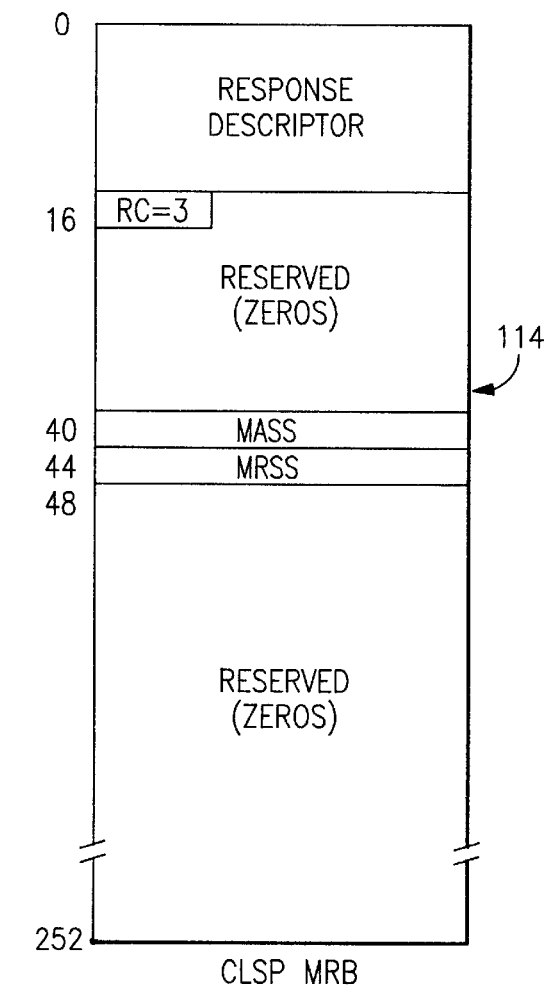

FIG. 21 shows the message response block (MRB) format for a Compute List Structure Parameters (CLSP) command when the response code (RC) is 3.

DESCRIPTION OF THE PREFERRED EMBODIMENT

Figure 1:
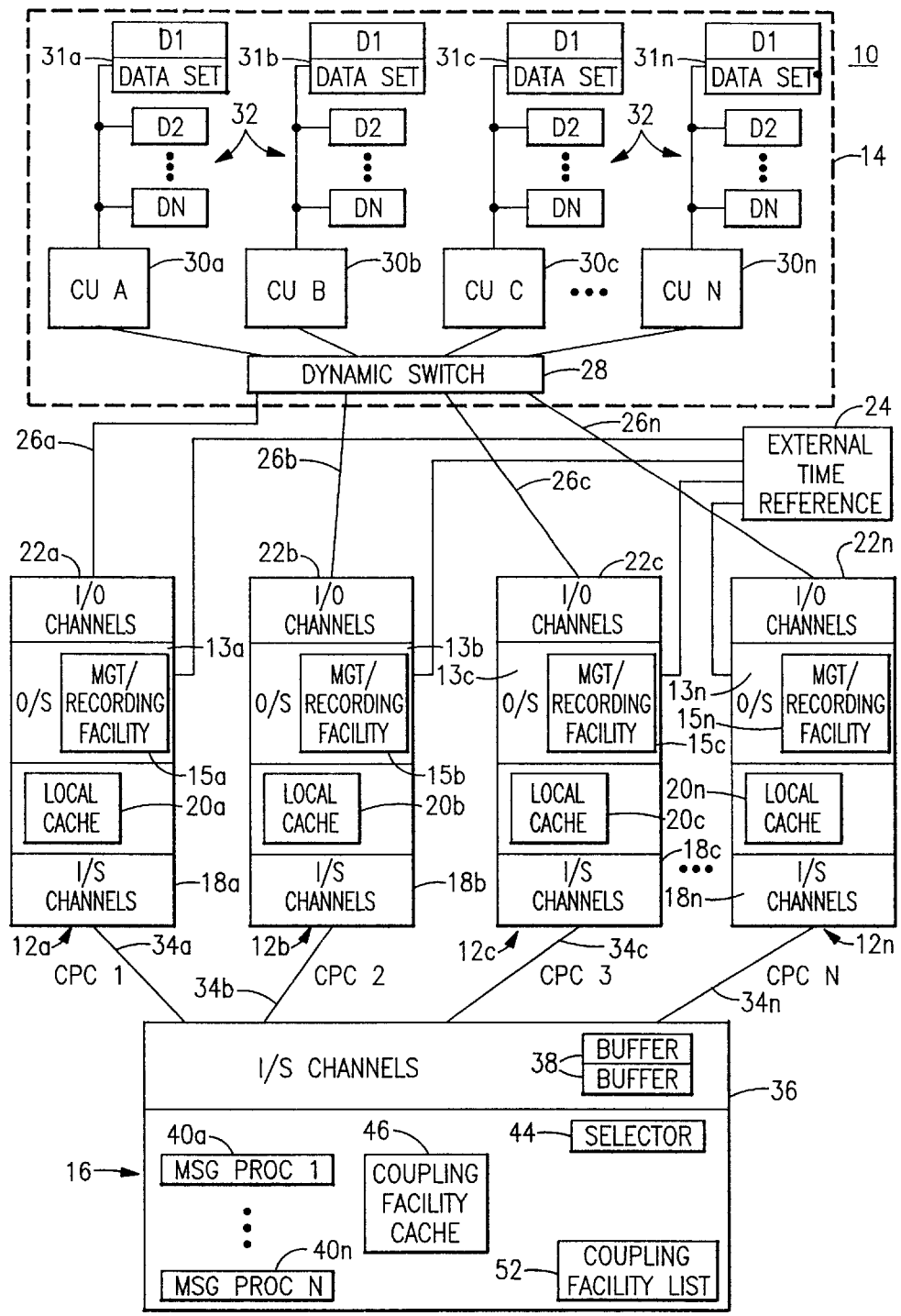
FIG. 1 depicts one example of a block diagram of a data processing system incorporating the present invention.

FIG. 1 is a block diagram of a data processing system 10 incorporating the present invention. Data processing system 10 includes multiple central processing complexes (CPCs) 12a through 12n which are coupled to an input/output (I/O) system 14 and a coupling facility (CF) 16. (As used herein, central processing complexes 12a–12n are collectively referred to as central processing complex (CPC) 12.) The main components associated with each central processing complex 12, input/output system 14 and coupling facility 16 are described in detail below.

Each of the CPCs 12a–12n may be an International Business Machines' (IBM) system following the Enterprise Systems Architecture/390 Principles of Operation as described in IBM publication SA22-7201-00, which is hereby incorporated by reference in its entirety. Each of CPCs 12a–12n includes one or more central processing units (CPUs) (not shown) which executes an operating system 13a–13n, respectively. As used herein, operating systems 13a–13n are collectively referred to as operating system 13. In one instance, operating system 13 is an International Business Machines' OS/390 operating system for controlling execution of programs and the processing of data, as is well known. In addition, each operating system 13a–13n includes a management/recording (MGT/Recording) facility 15a–15n, respectively, for managing structures and users of structures and for recording status of users and structures in a coupling facility, as described in U.S. Pat. No. 5,465,359, incorporated herein by reference.

In addition, each CPC 12a–12n contains a plurality of intersystem (I/S) channels 18a–18n, a plurality of local caches 20a–20n, and a plurality of input/output (I/O) channels 22a–22n, respectively. (Local caches 20a–20n are referred to herein collectively as local cache 20. Similarly, intersystem channels 18a–18n and input/output channels 22a–22n are collectively referred to as intersystem channels 18 and input/output channels 22, respectively.) It will be understood that input/output channels 22 are part of the well known channel subsystem (CSS), which also includes intersystem channels 18 disclosed herein, even though channels 18 and 22 are shown separately in FIG. 1 for convenience.

Coupled to each CPC 12a–12n is an external time reference (ETR) 24, which provides time stamps of control information to be written into a log to document recovery from failures, backing out of undesired operations and for audit trails. External time reference 24, which uses fiber optic interconnect cables, synchronizes the time clocks (not shown) of CPCs 12a–12n to a precision equal to or less than the duration of the shortest externally visible operation. External time reference 24 provides for cable length propagation time differences, where those differences are important, in order to be able to maintain synchronization to within the length of the mentioned external operation.

As depicted in FIG. 1, each central processing complex 12a–12n is coupled via a link 26a–26n, respectively, to input/output system 14. Input/output system 14 includes, for example, a dynamic switch 28, which controls access to multiple input/output (I/O) control units (CU) 30a through 30n and one or more direct access storage devices (DASD) D1 through DN (collectively referred to as DASD 32), which are controlled by the control units. Dynamic switch 28 may be an ESCON Director Dynamic Switch available from IBM Corporation, Armonk, N.Y. Such a dynamic switch is disclosed in U.S. Pat. No. 5,107,489, incorporated herein by reference. As is known, input/output commands and data are sent from a central processing complex 12a–12n to an I/O control unit 30a–30n through dynamic switch 28 by means of I/O channels 22a through 22n of the respective CPCs 12a through 12n. Channel programs for a particular I/O channel are established by channel command words (CCWs), as is well known in the art.

One or more of direct access storage devices 32 includes one or more data sets 31a–31n, respectively. In particular, DASD 32 may include one or more couple data sets for storing status information relating to one or more CPCs 12 (i.e., read information for all CPCs and write information relating to one CPC) and/or one or more function data sets for storing the active policy, as described in detail below. In one embodiment, the couple and function data sets are not stored on the same DASD data set or volume.

Each central processing complex 12a–12n is also coupled via a bus 34a–34n, respectively, to coupling facility 16. Coupling facility 16 contains storage accessible by the CPCs, performs operations requested by programs in the CPCs and maintains status regarding structures and users of structures located within the coupling facility. The coupling facility enables sharing of data, which is directly accessible by multiple operating systems. As described further below, the coupling facility contains control information regarding shared data and may contain shared data. In one embodiment, coupling facility 16 is a structured external storage (SES) processor and includes, for example, a plurality of intersystem (I/S) channels 36 for communicating with intersystem channels 18a18n, one or more buffers 38 located within intersystem channels 36 for storing data received from intersystem channels 18a18n, message processors 40a–40n for handling messages, a selector 44 for directing message requests received over an intersystem channel to a message processor 40a–40n, a coupling facility cache 46 and a coupling facility list 52, which are described in further detail below. Even though only one coupling facility 16 is shown in the embodiment of FIG. 1, it will be understood that multiple coupling facilities may be provided for, each with its own I/S channels and message paths connected to all or some subset of the CPCs 12a–12n.

Figure 2:
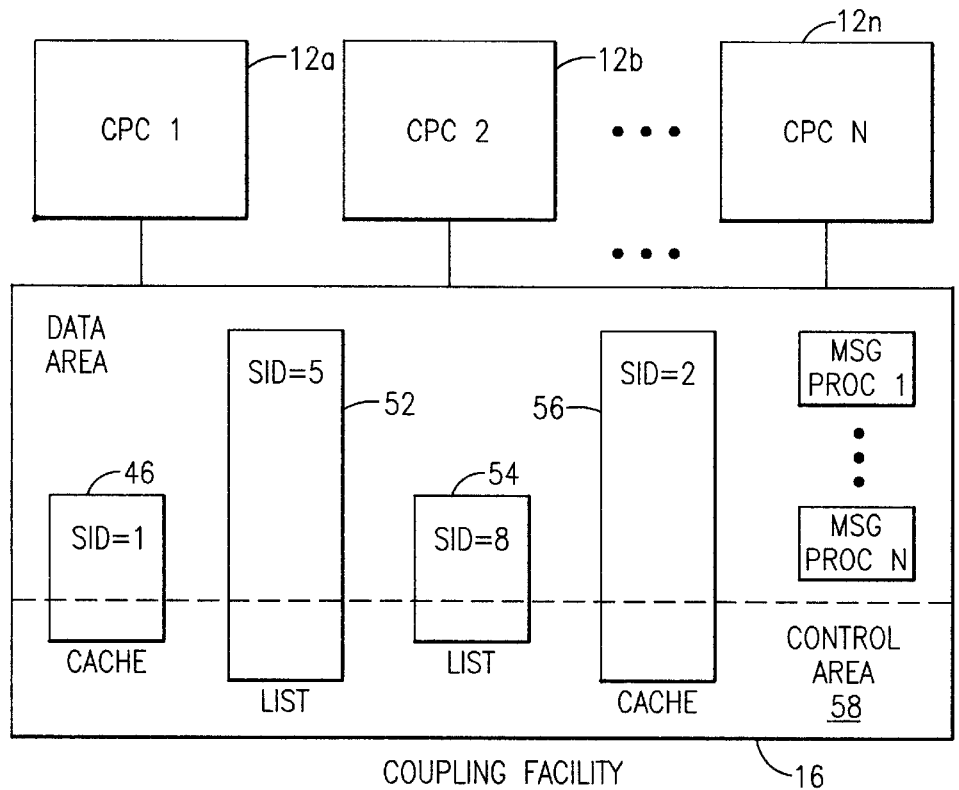
FIG. 2 depicts one example of a coupling facility including multiple storage structures.

Coupling facility cache 46 of coupling facility 16 is one example of a coupling facility storage structure. As shown in FIG. 2, coupling facility 16 includes multiple storage structures, such as storage structures 46, 52, 54 and 56. The storage structures include, for instance, list structures (for example, 52 and 54) and cache structures (for example, 46 and 56). Each coupling facility storage structure contains data objects and control objects. The data objects may reside in any storage location, whereas the control objects are generally restricted to control area 58.

Allocated structures (such as cache structures 46 and 56 and list structures 52 and 54) reside in separate coupling facility storage locations and are located by a structure identifier (SID). The SID value provides an identification of a target structure by a command. A command of a particular structure type, such as a cache-structure or list-structure command, may only address or alter the contents of a single structure of the given type. The allocation of a structure is described in detail below.

Figure 3:
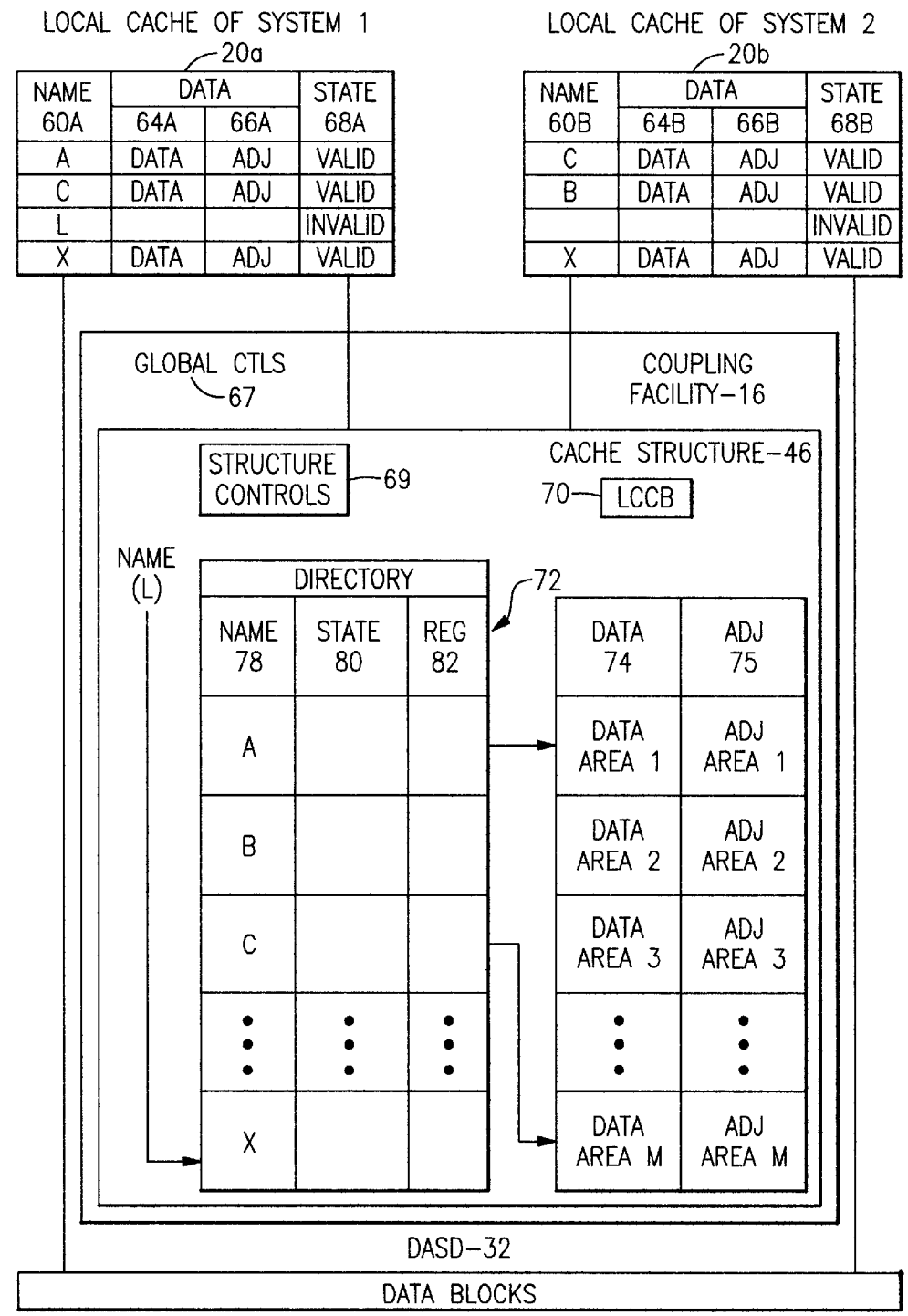
FIG. 3 depicts one embodiment of a three-level storage hierarchy in a network of attached processors.
Figure 7:
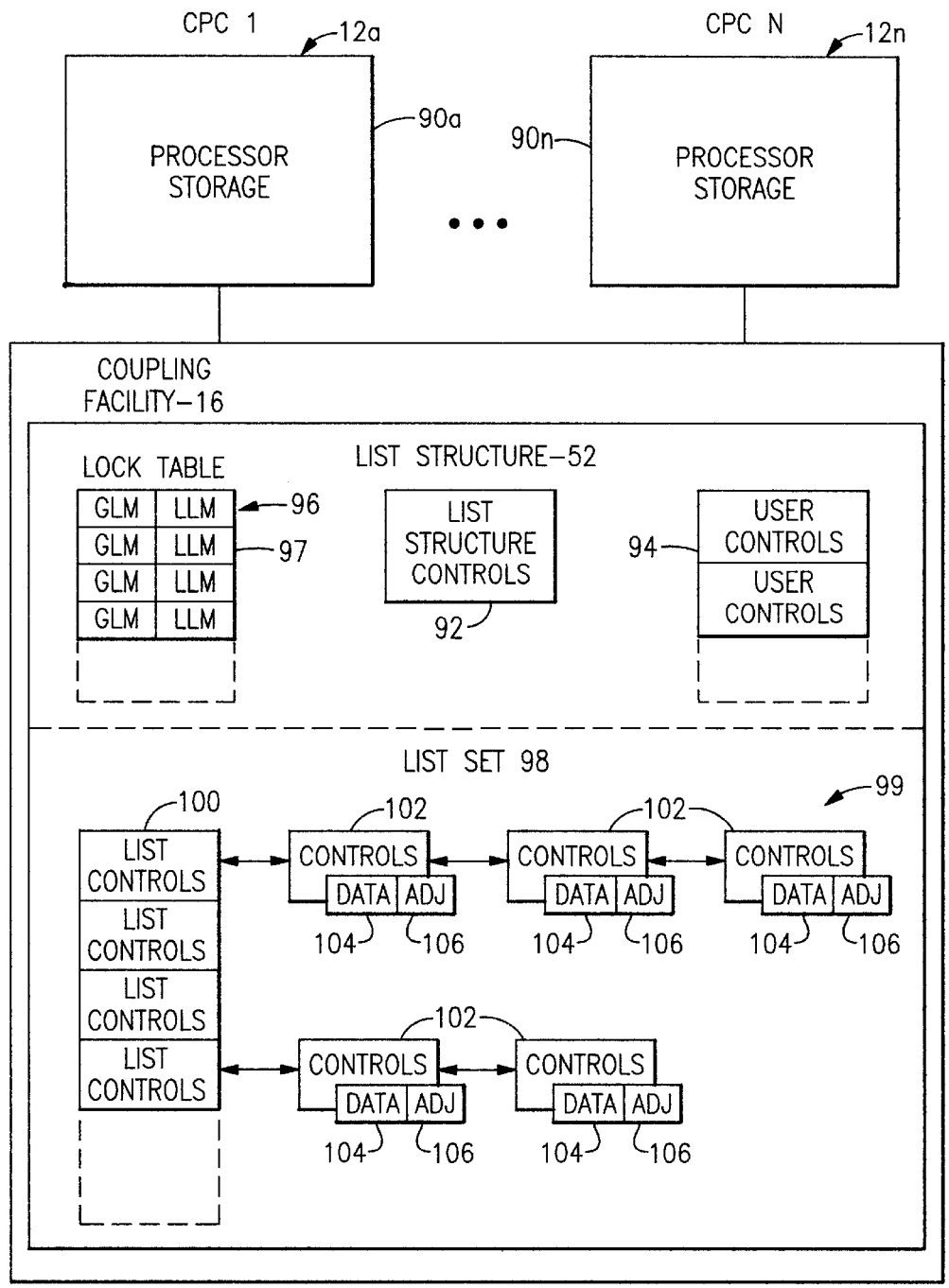
FIG. 7 depicts one example of a list structure.

The partitioning of the coupling facility storage and control area 58 into structures, as shown in FIGS. 2, 3 and 7, is managed by the operating system program. The data objects are organized in tables or lists with an optional adjunct data area. The remaining objects are controls. The relative amount of storage assigned to data and control objects is determined by program-specified parameters in the allocation commands.

Referring to FIG. 3, a three-level storage hierarchy in a network of attached processors 12a–12n is described. The lowest level of the hierarchy is DASD 32, the intermediate level is coupling facility cache structure 46, and the highest level is local cache 20 (e.g., local caches 20a and 20b). Each of these levels is described below.

Direct access storage devices 32 include data blocks which represent data stored in the devices. Local caches 20a and 20b include, for instance, a 16-byte name field 60A, 60B for referencing data; a data field 64A, 64B for storing the data; an optional adjunct data field 66A, 66B for additional data; and a state field 68A, 68B, respectively, for indicating whether the data is valid or invalid. When the data is located in local cache 20, the state of the data is either valid or invalid.

The data is validated by CPU instructions and invalidated by, for example, CF-write and CF-invalidate operations. The valid state of the data is tested by a CPU instruction. A valid named data object must be registered in a coupling facility cache directory, described below, in order to maintain local cache coherency. Local cache coherency is maintained by the invalidation process. A registered local-cache entry may test as invalid.

Cache structure 46 includes, for instance, a number of cache structure controls 69, a number of local-cache control blocks (LCCB) 70, a directory 72, a data area 74, and an adjunct area 75, each of which is explained in further detail below.

As shown in FIG. 4, cache structure controls 69 include, for instance, the following controls:

(a) Total-Directory-Entry Count (TDEC): A value that specifies the number of directory entries allocated for the cache.

(b) Total-Data-Area-Element Count (TDAEC): A value that specifies the number of data-area elements allocated for the cache.

(c) Adjunct-Assignment Indicator (AAI): A value that indicates the presence or absence of adjunct areas. Two possible values are: adjunct areas not assigned; adjunct areas assigned. When adjunct areas are assigned, an adjunct area is associated with each directory entry.

(d) Maximum Storage Class (MSC): A value that specifies the number of storage classes. Valid storage class values range from one to the maximum storage class value.

(e) Maximum Cast-Out Class (MCC): A value that specifies the number of cast-out classes. Valid cast-out class values range from one to the maximum cast-out class value.

(f) Data-Area-Element Characteristic (DAEX): A value that specifies the number of bytes in each data-area element. The size of the data-area element in bytes is the product of 256 and 2 raised to the power of the value specified in the data-area element characteristic.

(g) Maximum Data-Area Size (MDAS): A value that specifies the maximum allowable size of a data area as an integral multiple of the data-area-element size. The maximum data-area size is set by the program when the cache is allocated.

(h) Structure Size (SS): A value that specifies the number of units of, for example, CF storage allocated for the cache.

(i) Maximum Structure Size (MXSS): A value that specifies the maximum number of units of CF storage that can be allocated for the cache.

(j1) Minimum Apportionable Structure Size (MASS): A value that specifies the minimum number of 4K-byte units of CF storage that can be allocated for the cache, in integral multiples of the CF storage increment, that are sufficient for creating the associated controls, and enough elements and entries to substantially satisfy the target directory-to-data ratio (TDTDR).

(j2) Marginal Structure Size (MRSS): A value that specifies the minimum number of 4K-byte units of CF storage that are required for the creation of the associated controls for the cache structure, independent of either the storage increment size or the requested target directory-to-data ratio (TDTDR).

(The TDTDR is discussed further below as well as in U.S. Pat. Nos. 5,581,737, 5,544,345, 5,537,574 and 5,457,793, incorporated herein by reference.)

(k) Structure Authority (SAU): A value associated with each bit in a SID vector, described herein. The structure authority has two parts: A time of day (TOD), which reflects the moment when a system was allocating the structure and the system ID used to make the TOD unique. Paired with the sysplex name, it further identifies who caused the structure to be allocated.

(l) User Structure Control (USC): A value defined by the user.

(m) LCID Vector (LCIDV): A bit string with an initial value of zero. The bit positions start at zero and increase sequentially to the local-cache-identifier limit. The bit at position (i) in the string is set to one when a local cache is attached with a local-cache identifier (LCID) value of (i). When the bit is one, the local-cache-identifier is assigned. The bit at position (i) is reset to zero when the local cache is detached and LCID unassignment is requested, when the cache structure is de-allocated, or when a CF power-on reset occurs. When the bit is zero, the local-cache-identifier is not assigned.

A local cache may have, for instance, local-cache states and local-cache-identifier states, described below:

Local-Cache States: A cache structure local cache exists when the associated local-cache identifier is assigned. When a local cache exists, it is either in the attached or the detached state. A local cache is placed in the attached state by an attach-local-cache command, described below. A local cache is placed in the detached state by a detach-local-cache command, also described below, when the detachment process is complete.

Local-Cache-Identifier States: A local-cache identifier is in the assigned state when the associated assigned bit in the local-cache-identifier vector is one. A local-cache identifier is placed in the assigned state by the attach-local-cache command. A local-cache identifier is in the unassigned state when the associated bit in the local-cache-identifier vector is zero. A local-cache identifier is placed in the unassigned state by the detach-localcache command, depending on LCID-unassignment control, described herein.

In addition to the controls shown in FIG. 4, cache structure controls 69 may also include the following:

Target Structure Size (TSS): An integer that specifies the target number of units to be allocated.

Target Directory-Entry Count (TGDEC): An integer that specifies the target for the maximum number of possible directory entries in a cache structure.

Target Data-Area-Element Count (TGDAEC): An integer that specifies the target for the maximum number of data-area elements that are available for assignment to directory entries in a cache structure.

Pending Directory-to-Data Ratio (PDTDR): A field that contains the last requested target directory-to-data ratio on an allocate cache structure command.

Total structure changed count (TSCC).

Total changed data-area-element count (TCDAEC).

As mentioned above, in addition to structure controls 69, cache structure 46 includes local-cache control block 70. Local-cache control block 70 includes a number of local cache controls, described below, which are initialized when a local cache is attached to a coupling facility cache. The local-cache control block includes the user status, as described in U.S. Pat. No. 5,365,359. In one embodiment, local-cache control block 70 includes the following fields (FIG. 5):

(a) Local-Cache Identifier (LCID): A value that identifies a local cache. The controls are deleted when the local-cache identifier is unassigned and they are valid when the local-cache identifier is assigned.

(b) Attachment Status (AS): A control that describes the state of the attachment of a local cache. When the value of the attachment status is one, the local cache is active. When the value of the attachment status is zero, the local cache is inactive.

The attachment status controls the execution of commands that specify the local cache. When the local cache is active, all commands that specify the local cache are processed normally. When the local cache is inactive, all commands that specify the local cache, except attach local-cache, detach local-cache and read local-cache information are suppressed with a request-exception condition.

(c) Local-Cache Token (LCT): A value used to identify the local cache on the CPC.

(d) Local-Cache Authority (LCAU): A value set by the program when the local cache is attached.

(e) System Identifier (SYID): A value specified by the program when a message path, used to communicate commands and messages (as described in co-pending U.S. patent applications entitled, "Communicating Messages Between Processors And A Coupling Facility," by D. A. Elko et al., Ser. No. 08/420,893, filed Apr. 11, 1995, now U.S. Pat. No. 5,561,809, and "Message Path Mechanism For Managing Connections Between Processors And A Coupling Facility," by D. A. Elko et al., Ser. No. 08/324,447, filed Oct. 18, 1994, now U.S. Pat. No. 5,463,736, each of which is hereby incorporated herein by reference in its entirety) is activated. The system identifier is maintained in a message-path status vector and copied into the local cache controls when an attach-local-cache command is communicated over the message path.

(f) Attachment Information (AINF): A value set by the program when the local cache is attached.

(g) Detachment Restart Token (DRT): A value used to indicate how far along a detachment process has proceeded.

Referring back to FIG. 3, cache structure 46 also includes a directory 72. Directory 72 is a collection of directory entries positioned into storage classes and arranged as a fully associative array. The directory is a repository of state and location information for the storage hierarchy. The subset of changed directory entries is additionally positioned into cast-out classes. As described with reference to FIGS. 3 and 6, directory 72 includes a name field 78, a state field 80 for indicating the state of each directory entry and a register field 82, described below. Whenever a named data object is placed in the higher two levels of the storage hierarchy (i.e., coupling facility cache structure 46 and local cache 20), its name is registered in name column 78 and its state is registered in state column 80 by coupling facility cache directory 72. In general, state information indicates whether the data is changed, unchanged, locked for cast-out, or resident in coupling facility 16. In particular, state field 80 includes:

(a) A User-Data Field (UDF): The user-data field contains a value that is associated with the data when it is initially changed in the CF cache and is maintained until the data area is re-used. The user-data field is valid when the data is cached as changed.

(b) A Storage Class (SC): A value which identifies the storage class assigned for the name.

(c) A Change Indicator (C): A value which, in conjunction with the cast-out lock, indicates the changed state of the data.

When the change bit is one, the data is cached as changed. When the change bit is zero and the data is not locked for cast-out, the data is either not cached, or is cached but not changed. When the change bit is zero and the data is locked for cast-out, the data is cached as changed. Whenever the data is in the changed state, the most recent version of the data resides in the cache. When the change bit is one, the data bit must also be one.

(d) A Data-Cached Indicator (D): A value which indicates whether the data is located in the CF cache. When the data bit is one, the data is cached. When the data bit is zero, the data is not cached.

(e) A Cast-Out-Parity-Bits Indicator (CP): A field which indicates the current assignment of the cast-out parity. Three possible values are: cast-out parity is zero; cast-out parity is one; the cast-out parity is unknown.

(f) A Cast-Out Class (CC): A value which identifies the cast-out class assigned for the name.

(g) A Cast-Out-Lock Value (CLV): A value which indicates the cast-out state of the data. When the cast-out lock is zero, the data is not being cast-out. When the cast-out lock is not zero, the value of the first byte of the cast-out lock identifies the local cache that is casting out the data block from the CF cache to DASD. The value of the second byte identifies the cast-out process on the local system. When the cast-out lock is not zero, the data bit must be one.

(h) A Data-Area Size (DAS): A value that specifies the size of the data area as an integral multiple of the data-area-element size. The initial value is zero when the directory entry is assigned and is zero until the data bit is set to one.

In addition to the above, register 82 is a table containing information on the location of the locally cached copies of the data block. Each row in the table corresponds to an attached local cache. The columns contain the local cache identifier (LCID), local-cache-entry number (LCEN) and a valid bit (LVI) for the local-cache-entry number. A valid local-cache-entry number is registered in the local-cache register when the registration process is executed for the specified name and local cache. A local-cache-entry number is invalidated when a local cache is detected, or when an invalidate-complement-copies process is executed for the specified name and the local cache is a member of the set of local caches being invalidated. The LCEN field is invalid, when LVI is zero.

Location information includes which of the local caches 20a–20n contains a copy. Certain CF-read and CF-write commands register the local cache copy in coupling facility directory 72. CF write and CF-invalidate commands remove the registration and invalidate local copies.

Cache structure 46 further includes data areas 74 and optional adjunct data areas 75. The data sizes are variable with the range of variability being, in one embodiment, between 1 and n times the data-area element size. The data-area element size is fixed for each coupling facility cache structure 46 and is a power of 2 with a minimum size of 256 bytes.

Coupling facility cache 46 is normally smaller than DASD storage 32. Thus, periodically, the changed data is transferred from cache 46 to the backing DASD 32 (FIG. 3). This process, called cast-out, is controlled by the operating system program. In one embodiment, a control associated with a cast-out class includes a cast-out class count, which indicates the number of elements associated with the cast-out class. Cast-out involves for a coupling facility, such as a CF facility, the following operations:

A CF-read for cast-out operation is issued that sets the cast-out serialization and copies the data block to main storage which may or may not be put in local cache 20.

An I/O operation is executed that copies the data block to DASD 32.

A CF-unlock cast-out locks operation is issued that releases the cast-out serialization.

Multiple cast-out processes may co-exist for a single one of local caches 20a–20n. Whenever data is locked for cast-out, an identifier for local cache 20a–20n and an identifier for the cast-out process are placed in directory 72. This is disclosed in U.S. patent application Ser. No. 07/860,806 for "Management of Data Movement from a SES Cache to DASD" by D. A. Elko, et al. , now U.S. Pat. No. 5,493,668, incorporated herein by reference in its entirety as noted.

Described in detail above is one example of a cache storage structure. In addition to cache structures, there are list structures, such as list structure 52, depicted in FIGS. 2 and 7. Referring to FIG. 7, the contents of a list structure, such as list structure 52, are described in detail.

List structure 52 resides within coupling facility 16. As shown in FIG. 7, in one embodiment, coupling facility 16 is coupled to processor storage 90a–90n located within each CPC 12a–12n, respectively. List structure 52 includes list-structure controls 92, user controls 94 and, optionally, a lock table 96, and/or a list set 98. List set 98 includes list controls 100 and list-entry controls 102. Each of the components of list structure 52 is described in detail below.

List structure controls 92 contain attributes of the structure and are initialized when list structure 52 is created. One example of the controls associated with list structure controls 92 is depicted in FIG. 8. Referring to FIG. 8, list structure controls 92 include:

(a) Maximum Data-List-Entry Size (MDLES): An object or field that specifies the maximum size of the data list entry.

(b) List-Structure Type (LST): An object or field that indicates the list objects created on allocation. A field contains a counter indicator (CI), a lock indicator (LI), a data indicator (DI), an adjunct indicator (AI), a name indicator (NI) and a key indicator (KI).

The counter indicator specifies that either: a list-entry count and list-entry-count limit are defined or a list-element count and list-element-count limit are defined.

The lock indicator specifies whether or not a lock table is created.

The data and adjunct indicators specify whether: no list-set is created; list entries have adjunct only; list entries have data only; or list entries have data and adjunct in the list entries.

The name indicator specifies whether or not list entries are named.

The key indicator specifies whether or not the list entries are keyed.

(c) Lock-Table-Entry Characteristic (LTEX): An object or field that specifies the number of bytes in each lock-table entry.

The number of bytes is the product of 2 raised to the power of the LTEX value.

(d) List-Element Characteristic (LELX): An object or field that specifies the number of bytes in each list element. The number of bytes is the product of 256 and 2 raised to the power of the LELX value.

(e1) Minimum Apportionable Structure Size (MASS): A value that specifies the minimum number of 4K-byte units of CF storage that can be allocated for the list, in integral multiples of the CF storage increment, that are sufficient for creating the requested lock table entries, lists, associated controls, enough event monitor controls and list entries with their associated controls to substantially satisfy the target monitor-to-entry storage ratio (TMTESR), and enough entries and elements to substantially satisfy the target entry-to-element ratio (TETELR).

(e2) Marginal Structure Size (MRSS): A value that specifies the minimum number of 4K-byte units of CF storage that are required for the creation of the requested lock table entries, lists, and associated controls for the list structure, independent of either the storage increment size or the requested target entry-to-element ratio (TETELR).

(The TMTESR is discussed further below as well as in the commonly owned, copending application of D. J. Dahlen et al., Ser. No. 08/698,142, entitled "Monitoring and Notification for Central Processors of Subsidiary List Transitions in an External Storage Structure," filed Aug. 15, 1996, incorporated herein by reference. The TETELR is discussed further below as well as in U.S. Pat. No. 5, 581,737, incorporated herein by reference.)

(f) Lock-Table-Entry Count (LTEC): An object or field that specifies the number of lock-table entries allocated.

(g) List Count (LC): An object or field that specifies the number of lists created.

(h) Structure Size (SS): An object or field that specifies the amount of storage allocated.

(i) Maximum Structure Size (MXSS): A value that specifies the maximum number of units of CF storage that can be allocated for the list.

(j) Maximum List-Set-Element Count (MLSELC): An object or field that specifies the maximum number of list elements that are available for assignment to list entries or retry-data blocks, Or both, in the list set.

(k) List-Set-Element Count (LSELC): An object or field that specifies the number of list elements that have been assigned to list entries or retry-data blocks, or both, in the list set.

(l) Non-Zero-Lock-Table-Entry-Count (NLTEC): An object or field that specifies the number of non-zero lock-table entries that exist in the structure.

(m) Maximum List-Set-Entry Count (MLSEC): An object or field that specifies the maximum number of possible list entries in a list set.

(n) List-Set-Entry Count (LSEC): An object or field that specifies the number of existing list entries in the list set.

(o) Structure Authority (SAU): A value associated with each bit in the SID vector.

(p) User Structure Control (USC): A field per structure defined by the user.

(q) User-Identifier Vector (UIDV): An object or field that specifies the assigned UIDs, described below.

In addition to the controls shown in FIG. 8, list structure controls 92 may also include the following:

Event monitor controls count (EMCC).

Maximum event monitor controls count (MEMCC).

Pending entry-to-element ratio (PETELR): A field that contains the last requested target entry-to-element ratio on an allocate list structure command.

Pending monitor-to-entry storage ratio (PMTESR).

Target Maximum-Entry Count (TMEC): An integer that specifies the target for the maximum number of possible list entries in a list set.

Target Maximum-Element Count (TMELC): An integer that specifies the target for the maximum number of list elements that are available for assignment to list entries or retry-data blocks, or both, in the list set.

Target maximum event monitor count (TMEMC): A four-byte unsigned binary integer that specifies the target for the maximum number of event monitor controls objects that are available for registration of interest in subsidiary lists within the list set.

The TMEMC is discussed further in the commonly owned, copending application of D. J. Dahlen et al., Ser. No. 08/698,142, entitled "Monitoring and Notification for Central Processors of Subsidiary List Transitions in an External Storage Structure," filed Aug. 15, 1996, incorporated herein by reference.

Target Structure Size (TSS): An integer that specifies the target number of SES storage units to be allocated.

Referring back to FIG. 7, user controls 94 are created and initialized when the list-structure user is attached. User controls 94 include user status, as described in U.S. Pat. No. 5,465,359. In one embodiment, user controls 94 include the following fields (FIG. 9):

(a) A User Identifier (UID): A value that identifies an attached list user. A user identifier is either in the assigned or the unassigned state. A user identifier is in the assigned state when the associated assigned bit in the user-identifier vector is one. A user identifier is placed in the assigned state by the attach-list-structure-user command. A user identifier is in the unassigned state when the associated assigned bit in the user-identifier vector is zero. A user identifier is placed in the unassigned state by the detach-list-structure-user command, depending on detachment-request type, described below.

(b) A User State (US): A field that specifies the state of the user. The value has the following encoding: the user is detached; the user is attached. A list structure user exists when the associated user identifier is assigned. When a list structure user exists, it is either in the active or the inactive state. A user is placed in the active state by the attach-list-structure-user command. A user is placed in the inactive state by the detach-list-structure-user command when the detachment process is complete.

(c) A List-Notification Token (LNT): A value that specifies a list-notification vector to the system.

(d) A User Authority (UAU): A value that is compared and conditionally updated.

(e) A System Identifier (SYID): A value specified by the program when a message path is activated. The system identifier is maintained in the message-path status vector and copied into the user controls when an attach-list-structure-user command is communicated over the message path.

(f) A User-Attachment Control (UAC): A field per attached-user defined by the user.

(g) A Detachment Restart Token (DRT): A value used to indicate how far along a detachment process has proceeded.

Referring once again to FIG. 7, lock table 96 consists of a sequence of one or more lock table entries 97 identified by a lock-table-entry number (LTEN). In one embodiment, lock table entry 97 includes a lock-table-entry number (LTEN), which starts at zero and runs consecutively and a lock-table-entry value (LTEV), including a global-lock manager (GLM) object and optionally, a local-lock-manager (LLM) object or both. The lock-table entry format is determined by the list-structure type located within list structure controls 92.

Commands associated with list structure 52 provide a means for updating lock-table entry 97. That is, a command may compare global-lock managers (GLM) and conditionally replace a global-lock manager (GLM), a local-lock manager (LLM), or both the global-lock and local-lock managers (GLM) and (LLM). The list commands also provide a means for reading an entry in lock-table 96 or the next non-zero lock-table entry, or for clearing lock table 96.

As previously mentioned, also contained within list structure 52 is list set 98. In one example, list set 98 includes one or more lists 99 represented by list controls 100, which are numbered consecutively, starting at zero.

In one embodiment, list controls 100 include the following controls, as depicted in FIG. 10:

(a) List-Entry-Count Limit (LECL): An object or field that specifies the maximum number of possible list entries in a list.

This object is initialized to the maximum list-set-entry count when a list structure is created.

(b) List-Entry Count (LEC): An object or field that specifies the number of list entries currently in the list.

(c) List-State-Transition Count (LSTC): An object or field that specifies the number of empty to not-empty list state transitions that have occurred.

(d) List Authority (LAU): A value that is compared and conditionally updated. The LAU is initialized to zeros.

(e) User List Controls (ULC): A field per list defined by the user.

(f) List-Monitor-Table: The list-monitor table contains information used to process the list-notification vector of each user who has registered interest in the state transitions of the list.

The list-monitor table is a sequence of objects, called list-monitor-table entries. The number of list-monitor-table entries is determined when the table is created and is equal to the maximum number of list-structure users. The list-monitor-table entries are numbered from zero to the user-identifier limit and are indexed by the user identifier (UID).

Each list-monitor-table entry has a list-monitoring-active-bit object, a list-notification-request-type object and a list-notification-entry-number object, each of which is described below:

(1) List-Monitoring-Active Bit (LMAB): An object or field that specifies whether the user associated with the list-monitor-table entry is monitoring the list-state transitions of the list.

When a user is not monitoring a list, all previously issued list-notification commands on behalf of the associated user for this list are complete.

(2) List-Notification-Request Type (LNRT): An object or field that indicates whether the list-notification-vector summaries are to be updated when an empty to not-empty state transition occurs on a monitored list.

(3) List-Notification-Entry Number (LNEN): An object or field that specifies a list-notification-vector entry.

When a list-state transition occurs, one or more list-notification commands are initiated for each user who is monitoring the list to the system which attached the user. All the list-notification commands initiated as a result of the list-state transition are initiated before the command that caused the list-structure transition is completed.

The list-notification command provides the information necessary for the system to update one list-notification entry and, when requested, the associated list-notification summaries, to reflect the new list state.

A user becomes a list monitor by registering with the list by means of a registered-list-monitor command. A user ceases to be a list monitor by deregistering from the list by means of a deregister-list-monitor command or by detaching from the list structure by means of a detach-list-structure-user command.

A list-notification command issued to a system for a user as a result of a not-empty-to-empty list-state transition must complete before another list-notification command on behalf of the same list and user that specifies the opposite list-state transition may be issued.

All CF list-structure commands capable of adding, deleting, or moving a list entry execute the list-monitor-notification process for each user monitoring a list that changes state.

When a transition notification is initiated to a system, any previously initiated but unsent notifications for the same list and user may be purged.

Each list 99 consists of a sequence of zero or more entries. The list-structure type (described above) determines whether all the list entries in list set 98 have a data list entry 104, an adjunct list entry 106, or both. Associated with each entry of a list 99 is one of list-entry controls 102. Controls 102 contain list-entry-location information and other information for controlling operations against data list entry 104.

In particular, list entry controls 102 include the following controls, as depicted in FIG. 11:

(a) A Data-List-Entry Size (DLES) indicating the size of the associated data entry.

(b) A List Number (LN) representing the list that a particular entry is associated with.

(c) A List-Entry Identifier (LEID) identifying a particular list entry. The list-entry identifier is unique to a list set 98 and is assigned by coupling facility 16.

(d) A Version Number (VN) object that is conditionally compared and conditionally updated, reflecting a program specified state for the list entry.

(e) An optional List-Entry Key (LEK) indicating a key, if one exists. When list-entry keys exist, the keyed list entries are ordered by the key with the lowest numerical key at the leftmost position. Elements with the same key value may be located by first or last within the same key value.

When an unkeyed list entry is created or moved, the target list-entry position is always located by an unkeyed position. When a keyed list entry is created or moved, the target list-entry position is always located by a keyed position and first or last within the same key value.

(f) An optional List-Entry Name (LEN). A list-entry name is unique to a list set 98 (FIG. 7) at any particular instant and is provided by the operating system program.

In a similar manner, CF 16 may include an event monitor control block (EMCB) (not shown), which bears the same relation to TMEMC as LECB 102 does to TMEC. Such an event monitor control block would contain the following controls: user identifier (UID); event-monitor-queued indicator (EMQI); list number (LN); list-entry key (LEK); and user-notification control (UNC). Additionally, CF 16 may include an event queue control block (EQCB) (not shown) containing the following controls: event-notification-request type (ENRT); event-queue-monitoring-active bit (EQMAB); event-notification-entry number (ENEN); event-monitor-controls-queue count (EMCQC); and event-queue-transition count (EQTC). These control blocks are further described in the commonly owned, copending application of D. J. Dahlen et al., Ser. No. 08/698,142, entitled "Monitoring and Notification for Central Processors of Subsidiary List Transitions in an External Storage Structure," filed Aug. 15, 1996, incorporated herein by reference.

List commands provide a means for conditionally creating, reading, replacing, moving, or deleting one entry in list 99. A number of comparisons may be requested during these processes. They include a list-number comparison, a version-number comparison, a global-lock-manager (GLM) comparison, or any combination of the preceding. Additionally, when global locks are compared, local locks (LLM) may be compared. A list entry may be moved from one list 99 to another within the same structure 52 or from one position to another within the same list 99. This is disclosed in U.S. patent application Ser. No. 08/383,532 for "Method and Apparatus for Performing Conditional Operations on Externally Shared Data" by J. A. Frey, et al., now U.S. Pat. No. 5,742,830, incorporated herein by reference in its entirety as noted.

The position of a list entry in list 99 is determined when it is created, and may be changed when any entry in the list is created, deleted or moved. A list entry or list-entry position is located within a list set 98 by means of the list-entry identifier or the optional list-entry name (as described above), or by position. Position is specified by means of a list number, a direction, and an optional list-entry key.

The list commands also provide a means for synchronously writing and moving, moving and reading, or reading and deleting one entry of list 99. More than one list entry may be deleted synchronously, and more than one data list entry 104 or adjunct list entry 106 may also be read synchronously. Data list entry 104 is always returned in the data area designated in main storage by a message command/response block, described below. The adjunct list entry is returned in either a message command/response block or the data area, depending on the command. This is disclosed in U.S. patent application Ser. No. 07/860,633 for "Apparatus and Method for List Management in a Coupled DP System" by J. A. Frey, et al., now U.S. Pat. No. 5,410,695, incorporated herein by reference in its entirety, as noted.

Figure 12:
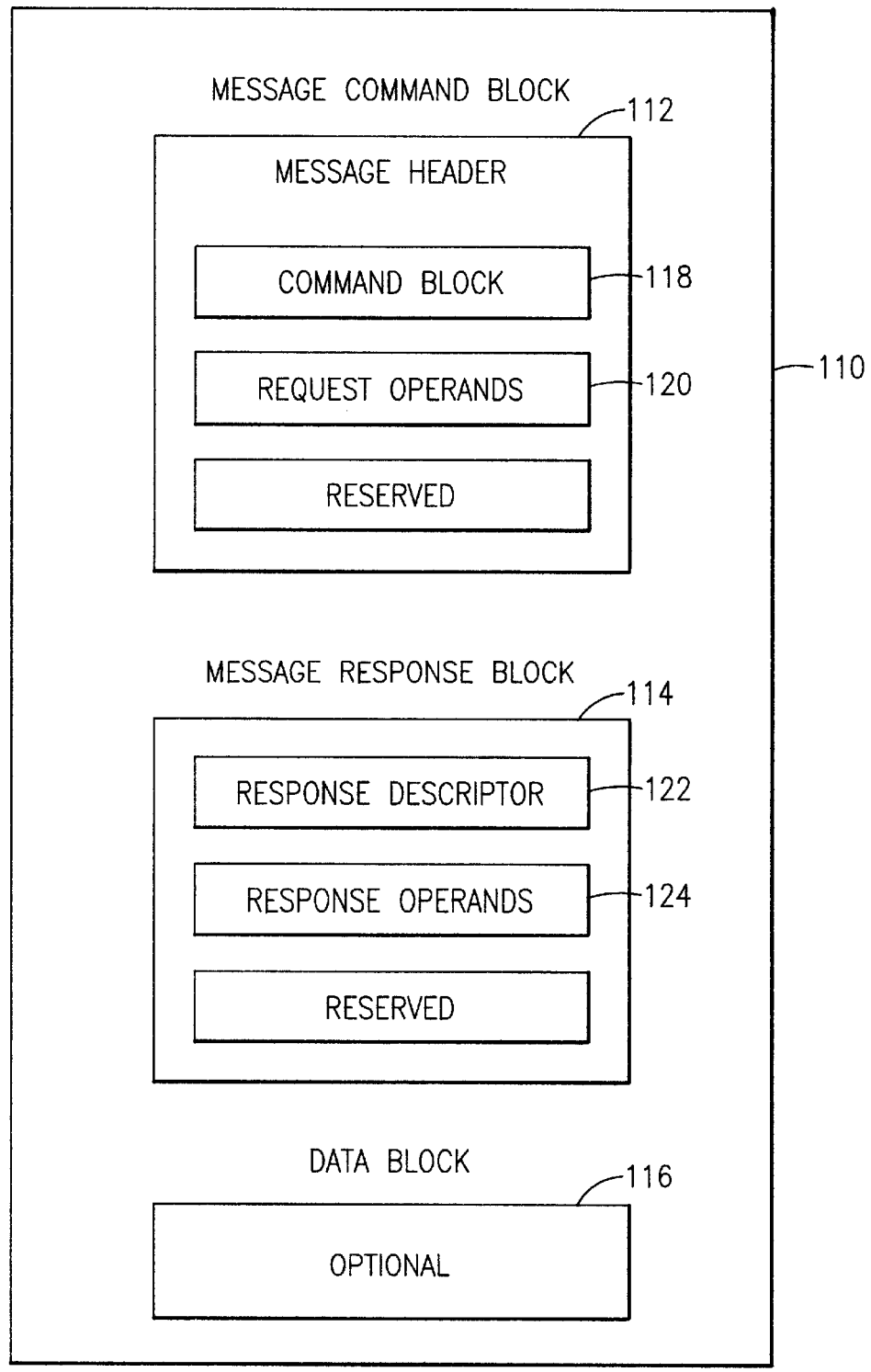
FIG. 12 depicts one example of a message command/response block.

In one embodiment, messages are communicated between CPC 12 and coupling facility 16 via a message command/response block 110 (FIG. 12). In one example, message command/response block 110 includes a message command block 112, a message response block 114 and an optional data block 116. Message command block 112 includes a command block 118 and a plurality of request operands 120 and message response block 114 includes a response descriptor 122 and a plurality of response operands 124. In one embodiment of the present invention, request operands 120 and response operands 124 include the operands listed below, which are depicted in FIG. 13. (An operand may be a request operand, a response operand or both, depending upon the command. It is also possible that other request and/or response operands exist, which are not shown in FIG. 13.) In one embodiment, the response/request operands include the following:

(a) Attachment Information (AINF): A value set by the program when the local cache is attached.

(b) Comparative Local-Cache Authority (CLCAU): A value used as a comparison value to the local-cache authority when a local-cache attachment is performed for an assigned local-cache identifier or when a local cache is detached.

(c) Comparative Structure Authority (CSAU): A value used as a comparison value to the structure authority when the structure is allocated and deallocated.

(d) Comparative User Authority (CUAU): A value that is compared to the user-authority object.

(e) Detachment-Request Type (DRT): A value that indicates whether the user identifier is to be unassigned when the list-structure user is detached. The value has one of two meanings: Keep the user identifier assigned and unassign the user identifier.

(f) List-Monitoring-Active Bit (LMAB): A value that specifies whether the user associated with the list-monitor-table entry is monitoring the list-state transitions of the list. The value has one of the two following meanings: Not monitoring the list and monitoring the list. When the list-monitoring-active bit indicates that the list is not monitored, all previously issued list-notification commands on behalf of the associated user for this list are complete.

(g) List-Notification-Entry Number (LNEN): An unsigned binary integer that specifies a list-notification-vector entry.

(h) List-Notification Token (LNT): A value that specifies a list-notification vector to the system. A list-notification token of zero indicates that the user may not be registered to monitor a list.

(i) LCID-Unassignment Control (LUC): A value that controls the unassignment of the local-cache identifier. When the value is one, the local-cache identifier is unassigned, and the local-cache controls are reset. The LCID value is available for assignment. When the value is zero, the LCID vector and the local-cache controls are not updated.

(j) Local-Cache Authority (LCAU): A value set by the program when the local cache is attached.

(k) Local-Cache-Entry Number (LCEN): A value that specifies a local cache entry.

(l) Local-Cache Identifier (LCID): An integer that identifies a local cache. The LCID must be assigned for a read-local-cache-information, attach local cache and detach local cache commands and must be attached for all other commands.

(m) Local-Cache Token (LCT): A value that identifies a local cache.

(n) Structure Authority (SAU): A value that is conditionally updated.

(o) User-Attachment Control (UAC): A field per attached user defined by the user.

(p) User Authority (UAU): A value that is compared and conditionally updated.

(q) User Identifier (UID): A value that identifies a user. A user identifier must identify an attached UID when a user is registered, and must identify an assigned UID when a user is deregistered or user controls are read.

(r) User State (US): A field that specifies the state of the user. The value has the following two meanings: The user is detached or the user is attached.

(s) User Structure Control (USC): A field per structure defined by the user.

(t) Allocation Type (AT): A field that indicates the type of allocation.

In addition to cache and list structures, there exists a lock structure which is comprised of a coupling facility list structure with an associated lock table and a set of operating system services to assist in lock contention resolution.

In support of the cache and list structures, described above, is a set of global controls 67, which is located in coupling facility 16 (see FIG. 3). In one embodiment, global controls 67 identify the coupling facility, describe its state, define its model-dependent limitations and summarize the status of its resources. In one example, global controls 67 include a free-space object, a free-control space object and a structure identifier (SID) vector. The SID vector is a string of bits, which increases sequentially having an initial value of zero. The structure identifier value provides an identification of a target structure by a command. A position i in the string is set to one when a structure is created with a SID value of i. The bit at position i is reset to zero when the structure is deallocated. A read SID vector command, returns the SID vector to the data area in the requesting program.

In one embodiment, a structure identifier is either in the assigned or unassigned state. A structure identifier is in the assigned state when the associated created bit in the structure-identifier vector is one. A structure identifier is placed in the assigned state when a structure is created by the allocate-cache,structure or allocate-list-structure command.

In addition, a structure identifier is in the unassigned state when the associated created bit in the structure-identifier vector is zero. A structure identifier is placed in the unassigned state by the deallocate-cache-structure or deallocate-list-structure command.

A coupling facility structure has one of the following states:

Allocated: The structure is created and commands are processed against structure objects.

Allocation Incomplete: An allocation process has been initiated for a structure, but the initialization of the structure objects has not completed.

Deallocation Incomplete: A deallocation process has been initiated for a structure, but the storage has not all been released.

Unassigned: The structure identifier (SID) value is available for selection by an allocate-cache-structure or allocate-list-structure command, as described in detail below.

A set of commands is provided for each coupling facility storage structure type, as well as additional commands for referencing global objects. The creation, deletion and attributes of a particular structure are controlled by the operating system program through allocation and de-allocation commands, described in detail below. Allocation commands for list structures are described in "Apparatus and Method For List Management In A Coupled DP System", by J. A. Frey et al., Ser. No. 07/860,633, filed Mar. 30, 1992, now U.S. Pat. No. 5,410,695, which is hereby incorporated by reference in its entirety. In addition, allocation commands for cache structures are described in "Sysplex Shared Data Coherency Method and Means", by D. A. Elko et al., Ser. No. 07/860,805, filed Mar. 30, 1992, now U.S. Pat. No. 5,537,574, which is also hereby incorporated by reference in its entirety. One embodiment of an allocate-cache-structure command is also described in detail below.

As described in detail herein, an allocate-cache-structure command updates the user structure control and (1) creates a cache structure or (2) continues or completes initial allocation of a cache structure. A cache structure is created on the first successful invocation of the allocate-cache-structure command for a structure that does not already exist. A cache structure is initially allocated after one or more successful invocations of the allocate-cache-structure command. These operations are referred to generically as cache-allocation processes.

One embodiment of the logic associated with an allocate-cache-structure command is described in detail with reference to FIGS. 14a–14b. Initially, a determination is made as to whether the value of the created bit in the structure identifier vector associated with the SID value is equal to zero, INQUIRY 130 "IS CREATED BIT OF SID=0?" If the value of the created bit associated with the SID is equal to zero, indicating a cache structure has not been created, then another determination is made as to whether the comparative structure authority (CSAU) request operand is equal to zero, INQUIRY 132 "DOES CSAU=0?" When the CSAU is not equal to zero, the structure authority value of zero in request/response operands (FIG. 13) and an error code are returned, STEP 134 "RETURN AND INDICATE ERROR."

Otherwise, if the CSAU is equal to zero, then the amount of storage is checked, INQUIRY 136 "SUFFICIENT STORAGE?" In particular, the free space and free control space objects in the global controls are checked. Should there be insufficient storage, an indication as such is returned, STEP 138 "RETURN AND INDICATE INSUFFICIENT STORAGE."

Should there be sufficient storage and therefore, a cache structure is created, global controls 67 and cache structure controls 69 are updated, STEPS 140, 142. In particular, when the cache structure is created, the created bit in the structure-identifier vector associated with the SID value is set to one and the free-space and free-control-space global objects are updated. In addition, the LCID vector of cache structure controls 69 is initialized to zero; the SAU operand of the request/response operands is placed in the structure authority object of cache structure controls; and the USC operand of the request/response operands is placed in the user-structure control.

Thereafter, there is an indication of whether a model-dependent time-out has occurred, INQUIRY 144 "MODEL-DEPENDENT TIME-OUT?" When a model-dependent time period has elapsed before the allocation processes are completed, the processes are checkpointed, STEP 146 "SET ALLOCATION CHECKPOINT." In particular, the structure size, cache structure controls 69, the free-space and free-control-space global objects are updated. Subsequently, the structure state control (not shown) in the structure controls is set as allocation incomplete, STEP 148 "SET STRUCTURE STATE ALLOCATION INCOMPLETE," and cache structure information and an exception response code are returned, STEP 150 "RETURN AND INDICATE NOT DONE."

Returning to INQUIRY 144, when a model-dependent time-out has not occurred, a determination is made as to whether the allocation process is complete, INQUIRY 152 "ALLOCATION COMPLETE?" In particular, the structure state control is checked and, if it is equal to one, allocation is complete and, if equal to zero, allocation is incomplete. Should allocation be complete, a successful response code is returned, indicating all requested cache-allocation processes are complete, STEP 154 "RETURN AND INDICATE COMPLETION."

Otherwise, when a cache structure is created but not completely allocated, all cache-structure commands issued to the structure except for the allocate-cache-structure, deallocate-cache-structure, and read-cache-structure-information commands are suppressed or terminated with an initial-allocation-incomplete status condition. Further, control and data areas are created, STEP 156 "CREATE CONTROL AND DATA AREAS." In particular, a directory and data areas are created. Thereafter, flow passes to INQUIRY 144 "MODEL-DEPENDENT TIME-OUT?"

Returning to INQUIRY 130, if the created bit of SID is not equal to zero, signifying a structure is created, a structure authority comparison is made, INQUIRY 158 "DOES STRUCTURE AUTHORITY=CSAU?" Should the value of SAU in cache structure controls 69 not be equal to the value of CSAU, the value of the structure authority in the request/response operands and an error code are returned, STEP 160 "RETURN AND INDICATED ERROR." Otherwise, a determination is made as to whether there is a user control update request, as specified as an input to the allocation command, INQUIRY 162 "USER CNTL UPDATE REQUEST?"

Should there be such a request, the user structure control in cache-structure controls 69 is updated, STEP 164 "UPDATE USER STRUCTURE CNTLS." Subsequent to updating the user structure controls or if there is no user control update request, a determination is made as to whether a model-dependent time-out has occurred, INQUIRY 166 "MODEL-DEPENDENT TIME-OUT?"

If a time-out has not occurred, then it is ascertained as to whether the allocation process is complete, INQUIRY 168 "ALLOCATION COMPLETE?" If allocation is incomplete, control and data areas are created, STEP 170 "CREATE CONTROL AND DATA AREAS," as described above, and flow passes to INQUIRY 166 in order to complete the initial allocation of the cache structure. On the other hand, when allocation is complete, the allocation incomplete state is reset, indicating allocation complete, STEP 172 "RESET ALLOCATION INCOMPLETE STATE." The allocation complete indication is then returned, STEP 174 "RETURN AND INDICATE COMPLETION."

Returning to INQUIRY 166, if a time-out has occurred, the allocation checkpoint is set, STEP 176 "SET ALLOCA- TION CHECKPOINT" and cache structure information and a response code are returned, indicating allocation incomplete, STEP 178 "RETURN AND INDICATE NOT-DONE."

After initial allocation is completed, an allocate-cache-structure command is always checkpointed when a successful or incomplete response code is returned. Also, after initial allocation is completed, an allocation process may be checkpointed anytime during the execution of a successful allocate-cache-structure command or when background processing continues as a result of a successful allocate-cache-structure command. Background processing of a successful allocate-structure command stops when a successful response code is returned. As described above, when a cache-allocation process is checkpointed, the structure controls and global controls are updated.

In one embodiment, in order to allocate a list structure, the logic associated with FIGS. 14a–14b may be used, as described in detail below. The allocate-list-structure command updates the user structure control and (1) creates a list structure or (2) continues or completes initial allocation of a list structure. A list structure is created on the first successful invocation of the allocate-list-structure command for a structure that does not already exist.

Referring to FIG. 14a, initially, a determination is made as to whether the value of the created bit in the structure identifier vector associated with the SID value is equal to zero, INQUIRY 130 "IS CREATED BIT OF SID=0?" If the value of the created bit associated with the SID is equal to zero, indicating a list structure has not been created, then another determination is made as to whether the comparative structure authority (CSAU) in request/response operands is equal to zero, INQUIRY 132 "DOES CSAU=0?" When the comparative structure authority is not equal to zero, the structure authority value of zero in request/response operands (FIG. 13) and an error code are returned, STEP 134 "RETURN AND INDICATE ERROR."

Otherwise, if the comparative structure authority is equal to zero, then the amount of storage is checked, INQUIRY 136 "SUFFICIENT STORAGE?" Should there be insufficient storage, an indication as such is returned, STEP 138 "RETURN AND INDICATE INSUFFICIENT STORAGE."

Should there be sufficient storage and therefore, a list structure is created, global controls 67 and list structure controls 92 are updated, STEPS 140, 142. In particular, when the list structure is created, the created bit in the structure-identifier vector associated with the SID value is set to one and the free-space and free-control-space global objects are updated. In addition, the UID vector of list structure controls 92 is initialized to zero; the SAU operand of request/response operands is placed in the structure authority object of list structure controls; and the USC operand of the request/response operands is placed in the user-structure control.

Thereafter, there is an indication of whether a model-dependent time-out has occurred, INQUIRY 144 "MODEL-DEPENDENT TIME-OUT?" When a model-dependent time period has elapsed before the allocation processes are completed, the processes are checkpointed, STEP 146 "SET ALLOCATION CHECKPOINT." In particular, the structure size, list structure controls 92, the free-space and free-control-space global objects are updated. Subsequently, the structure state control (not shown) in the structure controls is set as allocation incomplete, STEP 148 "SET STRUCTURE STATE ALLOCATION INCOMPLETE," and list structure information and an exception response code are returned, STEP 150 "RETURN AND INDICATE NOT DONE."

Returning to INQUIRY 144, when a model-dependent time-out has not occurred, a determination is made as to whether the allocation process is complete, as described above, INQUIRY 152 "ALLOCATION COMPLETE?" Should allocation be complete, a successful response code is returned, indicating all requested list-allocation processes are complete, STEP 154 "RETURN AND INDICATE COMPLETION."

Otherwise, when a list structure is created but not completely allocated, all list-structure commands issued to the structure except for the allocate-list-structure, deallocate-list-structure, and read-list-structure-information commands are suppressed or terminated with an initial-allocation-incomplete status condition. Further, control and data areas are created, STEP 156 "CREATE CONTROL AND DATA AREAS." In particular, list controls, list entry controls, data list elements and the lock table are created. Thereafter, flow passes to INQUIRY 144 "MODEL-DEPENDENT TIME-OUT?"

Returning to INQUIRY 130, if the created bit of SID is not equal to zero, signifying a structure is created, a structure authority comparison is made, INQUIRY 158 "DOES STRUCTURE AUTHORITY=CSAU?" Should the value of SAU in list structure controls 69 not be equal to the value of CSAU, the value of the structure authority in the request/response operands and an error code are returned, STEP 160 "RETURN AND INDICATED ERROR." Otherwise, a determination is made as to whether there is a user control update request, as specified as an input to the allocation command, INQUIRY 162 "USER CNTL UPDATE REQUEST?"

Should there be such a request, the user structure control in list-structure controls 92 is updated, STEP 164 "UPDATE USER STRUCTURE CNTLS." Subsequent to updating the user structure controls or if there is no user control update request, a determination is made as to whether a model-dependent time-out has occurred, INQUIRY 166 "MODEL-DEPENDENT TIME-OUT?"

If a time-out has not occurred, then it is ascertained as to whether the allocation process is complete, INQUIRY 168 "ALLOCATION COMPLETE?" If allocation is incomplete, control and data areas are created, STEP 170 "CREATE CONTROL AND DATA AREAS," as described above, and flow passes to INQUIRY 166 in order to complete the initial allocation of the list structure. On the other hand, when allocation is complete, the allocation incomplete state is reset, indicating allocation complete, STEP 172 "RESET ALLOCATION INCOMPLETE STATE." The allocation complete indication is then returned, STEP 174 "RETURN AND INDICATE COMPLETION."

Returning to INQUIRY 166, if a time-out has occurred, the allocation checkpoint is set, STEP 176 "SET ALLOCATION CHECKPOINT" and list structure information and a response code are returned, indicating allocation incomplete, STEP 178 "RETURN AND INDICATE NOT-DONE."

After initial allocation is complete, an allocate-list-structure command is always checkpointed when a successful response code is returned. Also, after initial allocation is complete, an allocation process may be checkpointed any time during the execution of a successful allocate-list-structure command or when background processing continues as a result of a successful allocate-list-structure command. Background processing of a successful allocate-list-structure command stops when a successful response code is returned. When a list-allocation process is checkpointed, the structure size, list-structure objects, the free-space and free control-space global objects are updated.

The above description of the allocate structure commands has been slightly simplified for the purposes of exposition. A fuller description of these commands appears in the appendix to this specification.

Although they form no part of the present invention, further details of the operation of the coupling facility may be found in U.S. Pat. No. 5,465,359 as well as the other references cited above.

Compute Commands

Command Execution

Response Code (RC)

A Response Code (RC) of 254 indicates that message processor command execution was completed and produced less probable results for which:

1. The command is either a path, direct, or intermediate command.
2. The condition is pervasive.
3. The result is unexpected.
4. The response code (RC), exception code (EC), and status conditions (SC) are the only response operands required.
5. No message processor objects are updated with the possible exception of the retry buffer.

Status Conditions (SC)

Request Exception: The request operand is improperly specified or an unassigned command code (CC) is issued. For direct, forwarded, and path commands, conditions leading to the recognition of an improper request operand are given in the description of the individual operands. For intermediate commands, a request exception occurs when the write indicator in the command code (CC) is set to one.

Exception Code (EC): The exception code (EC) is a two-byte value that identifies a request exception condition. When a request exception is recognized, the EC response operand is set to the value defined in the command description associated with the request exception. The EC response operand is not meaningful unless the response code (RC) is 254 and bit 4 in the status conditions (SC) is set to one.

The following is the response format for all commands when the response code (RC) is 254.

Table 1. Response Format for All Commands when the Response Code (RC) is 254

| Bytes   | Response Operand    | Acronym |
|---------|---------------------|---------|
| 0–15    | Response descriptor |         |
| 16      | Response code       | RC      |
| 17–19   | Status conditions   | SC      |
| 20–29   | Reserved (zeros)    |         |
| 30–31   | Exception code      | EC      |
| 32–255  | Reserved (zeros)    |         |

Compute Cache Structure Parameters (CCSP) Command

In accordance with the present invention, cache allocation parameters are computed upon execution of this command and returned in the message response block (MRB) 114 (FIG. 12). The set of values specified as input values for the computation are controlled by the target structure size (TSS) request operand.

The Compute Cache Structure Parameters (CCSP) command has the following set of operands:

Adjunct Assignment Indicator (AAI): A one-bit value that controls the assignment of adjunct areas. The two possible values are:

0 Adjunct areas not assigned
1 Adjunct areas assigned

When the indicator has a value of one, an adjunct area is assigned to each directory entry.

This operand is ignored if the second two-byte field of the target directory-to-data ratio (TDTDR) is zero and the target structure size (TSS) is nonzero, or if the target data area element count (TGDAEC) and target structure size (TSS) are both zero.

Data Area Element Characteristic (DAEX): A one-byte unsigned binary integer that specifies the number of bytes in each data area element. The size of the data area element in bytes is the product of 256 and 2 raised to the power of the value specified in the data area element characteristic (DAEX). Valid sizes in bytes are 256 to the maximum data area element size (MDAS).

Marginal Structure Size (MRSS): A four-byte unsigned binary integer that specifies the minimum number of 4K-byte units of CF storage that are required for the creation of the associated controls for the cache structure, independent of either the storage increment size or the requested target directory-to-data ratio (TDTDR).

Maximum Castout Class (MCC): A two-byte unsigned binary integer that specifies the number of castout classes. Valid castout class values range from 1 to the maximum castout class (MCC).

Maximum Data Area Size (MDAS): An eight-bit binary value that specifies the maximum allowable size of a data area as an integral multiple of the data area element size. When the second number of the target directory-to-data ratio (TDTDR) is greater than zero and the target structure size (TSS) is nonzero, or when the target data area element count (TGDAEC) is greater than zero and the target structure size (TSS) is zero, valid values range from 1 to the smaller of the two numbers: 255 and $256/2^{DAEX}$, where DAEX is the data area element characteristic. The value must be zero if the second two-byte field of the target directory-to-data ratio (TDTDR) is zero and the target structure size (TSS) is nonzero, or when the target data area element count (TGDAEC) and target structure size (TSS) are both zero.

Maximum Storage Class (MSC): A one-byte unsigned binary integer that specifies the number of storage classes. Valid storage class values range from 1 to the maximum storage class (MSC).

Maximum Structure Size (MXSS): A four-byte value that specifies the maximum number of 4096-byte units of CF storage allocated for the cache structure. Valid sizes are from the smallest number of 4096-byte units sufficient for creating the directory, local cache register, storage class controls, and castout class controls to a maximum of $2^{44}-4096$ bytes. When the target structure size (TSS) is zero, zero is also a valid value.

Minimum Apportionable Structure Size (MASS): A four-byte unsigned binary integer that specifies the minimum number of 4K-byte units of CF storage that can be allocated for the cache, in integral multiples of the CF storage increment, that are sufficient for creating the associated controls, and enough elements and entries to substantially satisfy the target directory-to-data ratio (TDTDR).

Minimum Required Control Storage (MRCS): A four-byte unsigned binary integer that specifies the minimum number of 4K-byte units that must be allocated from control storage.

Target Directory-to-Data Ratio (TDTDR): A four-byte field consisting of two two-byte unsigned binary integers that specify the target for the relative number of directory entries to data area elements possible in the cache. The first two bytes contain the first number and the second two bytes contain the second number.

The first number divided by the sum of the two numbers represents the fraction of the total count of directory entries and data area elements that consists of directory entries. The second number divided by the sum of the two numbers represents the fraction of the total count of directory entries and data area elements that consists of data area elements.

With one exception, the first number must be nonzero. The second number divided by the first number must not exceed the maximum data area size (MDAS). When the second number is zero, no data area elements are computed, and the cache structure is said to be a directory-only cache. The exception to the requirement that the first number be nonzero occurs when the target structure size (TSS) is zero. In this case, it is valid for the first and second numbers to both be zero.

Target Data Area Element Count (TGDAEC): A four-byte unsigned binary integer that specifies the target for the maximum number of data area elements that are available for assignment to directory entries in a cache structure. Valid counts are from 0 to $2^{32}-1$.

When the cache is a directory-only cache, the target data area element count (TGDAEC) must be zero. When the cache is not a directory-only cache, the value of the target data area element count (TGDAEC) divided by the value of the target directory entry count (TGDEC) cannot exceed the maximum data area size (MDAS).

This operand is ignored unless the target structure size (TSS) is zero.

Target Directory Entry Count (TGDEC): A four-byte unsigned binary integer that specifies the target for the maximum number of possible directory entries in a cache structure. Valid counts are from 0 to $2^{32}-1$.

When the cache is not a directory-only cache, the value of the target data area element count (TGDAEC) divided by the value of the target directory entry count (TGDEC) cannot exceed the maximum data area size (MDAS). This operand is ignored unless the target structure size (TSS) is zero.

Target Structure Size (TSS): A four-byte unsigned binary integer that, when nonzero, specifies the number of 4K-byte units to be allocated. When a cache structure is created and the target structure size (TSS) is zero, the number of 4K-byte units to be allocated is computed based on the values of the specified target directory entry count (TGDAEC) and target data area element count (TGDEC). The computed number is placed in the target structure size (TSS) response operand.

Referring also to FIG. 15, the Compute Cache Structure Parameters (CCSP) command has the following message command block (MCB) format:

| Bytes | Request Operand | Acronym |
|---|---|---|
| 0–15 | Message header | |
| 16–17 | Command code | CC |
| 18–19 | Reserved (zeros) | |
| 20 | Bit  Description | |
| | 0   Adjunct assignment indicator | AAI |
| | 1–7  Reserved (zeros) | |
| 21 | Maximum data area size | MDAS |
| 22–23 | Reserved (zeros) | |
| 24–27 | Target structure size | TSS |
| 28–31 | Maximum structure size | MXSS |
| 32–95 | Reserved (zeros) | |
| 96 | Data area element characteristic | DAEX |
| 97 | Maximum storage class | MSC |
| 98–99 | Maximum castout class | MCC |
| 100–103 | Target directory-to-data ratio | TDTDR |
| 104–107 | Target directory entry count | TGDEC |

-continued

| Bytes | Request Operand | Acronym |
|---|---|---|
| 108–111 | Target data area element count | TGDAEC |
| 112–255 | Reserved (zeros) | |

FIG. 16 shows the processing of a CCSP command by the coupling facility. The type of processing depends on the value of the TSS operand supplied in the MCB 112 (indicated in FIG. 16 as "MCB.TSS"), as determined at step 1602.

If the target structure size (TSS) request operand is zero, the target directory entry count (TGDEC), the target data area element count (TGDAEC), the adjunct assignment indicator (AAI), the maximum data area size (MDAS), the data area element characteristic (DAEX), the maximum storage class (MSC), the maximum castout class (MCC), and, optionally, the maximum structure size (MXSS) are input values for the computation. The cache structure initial allocation process is invoked with these inputs, but no structure is created. The CF 16 computes the target ratio, in this case the target directory-to-data ratio (TDTDR) (step 1604), and computes the marginal structure size (MRSS), the minimum apportionable structure size (MASS), the minimum required control storage (MRCS) and the target structure size (TSS) on the assumption that MXSS is equal to TSS (step 1606).

The target structure size (TSS), minimum apportionable structure size (MASS), and marginal structure size (MRSS) are calculated according to the rules for updating the corresponding objects. The target directory-to-data ratio (TDTDR) is computed following the rules for updating the pending directory-to-data ratio (PDTDR) object. The minimum required control storage (MRCS) is the amount of control storage that would be minimally required to create the structure with the computed target structure size (TSS).

If the supplied maximum structure size (MXSS) request operand ("MCB.MXSS") is zero (step 1608), then MXSS is set equal to the computed target structure size (TSS) (step 1610). If at step 1608 the supplied maximum structure size (MXSS) request operand is greater than zero, then it is compared with the computed target structure size (TSS) (step 1612). If the supplied maximum structure size (MXSS) is less than or equal to the computed target structure size (TSS), then the procedure branches to step 1610, and MXSS is set equal to the computed TSS.

If at step 1612 the supplied maximum structure size (MXSS) is greater than the computed target structure size (TSS), then the supplied MXSS value becomes an additional input to the computation; that is, MXSS is set equal to the supplied MXSS operand (step 1614), and MRSS, MASS, MRCS and TSS are recomputed using that value (step 1616).

Following step 1610 or 1616, the computed ratio (in this case TDTDR) and the computed values MRSS, MASS, MRCS, TSS and MXSS are placed in the message response block (MRB) 114, along with the target counts (in this case TGDEC and TGDAEC) (step 1618), and a response code (RC) of zero is returned (step 1620).

If at step 1602 the target structure size (TSS) request operand is greater than zero, the target structure size (TSS), maximum structure size (MXSS), target directory to data ratio, the adjunct assignment indicator (AAI), the maximum data area size (MDAS), the data area element characteristic (DAEX), the maximum storage class (MSC), and the maximum castout class (MCC) are input values for the computation. The cache structure initial allocation process is invoked with these inputs, but no structure is created.

The minimum apportionable structure size (MASS) and marginal structure size (MRSS) are then computed according to the rules for updating the corresponding objects (FIG. 4) (step 1622).

If the target structure size (TSS) request operand is invalid, that is, either smaller than the marginal structure size (MRSS) or larger than the maximum structure size (MXSS) (step 1624), the minimum apportionable structure size (MASS) and the marginal structure size (MRSS) are placed in the message response block (MRB) 114 (step 1626) and a response code (RC) of 3 is returned (step 1628).

If at step 1624 the target structure size (TSS) is valid, that is, neither smaller than the marginal structure size (MRSS) nor larger than the maximum structure size (MXSS), then the target counts (in this case, TGDEC and TGDAEC) and MRCS are computed (step 1630); the target counts are computed according to the rules for updating the corresponding objects. The computed target counts, MRSS, MASS and MRCS are placed in the message response block (MRB) 114, along with TSS, MXSS and the ratio TDTDR (step 1632), and a response code (RC) of zero is returned (step 1620).

When a request exception is recognized, an exception code (EC) is written in bytes 30 and 31 of the message response block (MRB). Command execution is suppressed and bit 4 in the SC operand is set to one.

Response Codes

| RC | Description | Priority |
|---|---|---|
| 0 | Allocation parameters returned | 7 |
| 1–2 | Reserved | |
| 3 | Invalid target structure size (TSS) | 6.M |
| 4 | Computed value exceeds $2^{32} - 1$ | 7 |
| 5–253 | Reserved | |
| 254 | Command execution suppressed | |
| | SC  Description | |
| | 0   Facility paused | 1.A.2 |
| | 1   Inactive path | 1.A.3 |
| | 4   Request exception | 6.D |
| | 5   Incorrect facility state | 6.E |
| | 15  Path not available | 1.A.1 |
| | 23  Facility damage | 4 |
| 255 | Command execution terminated | |
| | SC  Description | |
| | 23  Facility damage | 2 |

Referring also to FIG. 17, the message response block (MRB) format when the response code (RC) is 0 is:

| Bytes | Response Operand | Acronym |
|---|---|---|
| 0–15 | Response descriptor | |
| 16 | Response code | RC |
| 17–31 | Reserved (zeros) | |
| 32–35 | Target structure size | TSS |
| 36–39 | Target directory entry count | TGDEC |
| 40–43 | Target data area element count | TGDAEC |
| 44–47 | Target directory-to-data ratio | TDTDR |
| 48–51 | Minimum required control storage | MRCS |
| 52–79 | Reserved (zeros) | |
| 80–83 | Maximum structure size | MXSS |
| 84–87 | Minimum apportionable structure size | MASS |

-continued

| Bytes | Response Operand | Acronym |
|---|---|---|
| 88–91 | Marginal structure size | MRSS |
| 92–255 | Reserved (zeros) | |

Referring also to FIG. 18, the response format when the response code (RC) is 3 is:

| Bytes | Response Operand | Acronym |
|---|---|---|
| 0–15 | Response descriptor | |
| 16 | Response code | RC |
| 17–83 | Reserved (zeros) | |
| 84–87 | Minimum apportionable structure size | MASS |
| 88–91 | Marginal structure size | MRSS |
| 92–255 | Reserved (zeros) | |

Similarly, the response format when the response code (RC) is 4 is:

| Bytes | Response Operand | Acronym |
|---|---|---|
| 0–15 | Response descriptor | |
| 16 | Response code | RC |
| 17–255 | Reserved (zeros) | |

The response format when the response code (RC) is 254 or 255 is shown in Table 1 above.

The request and response operands for the CCSP command are cache operands which are defined above. The command is defined as a global command since no valid SID is provided. The CCSP command invokes cache processes but does not address any specific cache structure.

Physical storage limitations in the coupling facility do not affect the calculations, which are based on internal cache allocation algorithms and fixed attributes of the coupling facility such as the storage increment size. Thus the computed allocation parameters describe an idealized cache structure and there is no assurance that the structure can be created in the facility.

Compute List Structure Parameters (CLSP) Command

In accordance with the present invention, target object values and structure size object values are computed on execution of this command and returned in the message response block (MRB) 114. The set of values specified as input values for the computation are controlled by the target structure size (TSS) request operand.

The Compute List Structure Parameters (CLSP) command has the following set of operands:

List Count (LC)

A four-byte unsigned binary integer that specifies the number of lists to be allocated. Valid counts are from 1 to the list number limit. This operand is ignored when no list set is allocated.

List Element Characteristic (LELX)

A one-byte unsigned binary integer that specifies the number of bytes in each list element. Valid sizes are from 256 bytes to the maximum list element size in powers of 2. This operand is ignored when the data indicator (DI) in the list structure type (LST) is zero.

List Structure Type (LST)

A seven-bit value that indicates the list objects that would be created on allocation. The first bit is a program list entry identifier indicator (PLEIDI). The second bit is an element count indicator (ECI) that is not relevant to the CLSP command. The third bit is a lock indicator (LI). The fourth bit is a data indicator (DI). The fifth bit is an adjunct indicator (AI). The sixth bit is a name indicator (NI). And the seventh bit is a key indicator (KI).

The program list entry identifier indicator (PLEIDI) has the following encoding:

0 The structure uses a coupling-facility-assigned LEID value.
   1 The structure uses a program-assigned LEID value.

The lock indicator (LI) has the following encoding:

0 No lock table is allocated
   1 A lock table is allocated

The data and adjunct indicators (DI, AI) have the following encoding:

00 No list set is allocated
   01 List entries have adjunct only
   10 List entries have data only
   11 List entries have data and adjunct The name indicator (NI) has the following encoding:

0 List entries not named
   1 List entries named

The key indicator (KI) has the following encoding:

0 List entries not keyed
   1 List entries keyed

When a list structure is computed, (1) the lock indicator (LI) acts as a validity bit for the lock table entry characteristic (LTEX) and lock table entry count (LTEC) specified, (2) the data and adjunct indicators (DI, AI) act as validity bits for the list count (LC), the name indicator (NI), and the key indicator (KI) specified, (3) the data indicator (DI) also acts as a validity bit for the list element characteristic (LELX), (4) at least one of the lock, data or adjunct indicators (LI, DI, AI) must be one, (5) the name indicator (NI) and the key indicator (KI) may not both be one, and (6) the element count indicator (ECI) cannot be one if the data indicator (DI) is zero.

The name and key indicators (NI, KI) are ignored when no list set is specified.

Lock Table Entry Characteristic (LTEX)

A one-byte unsigned binary integer that specifies the number of bytes in each lock table entry. The value of the lock table entry size in bytes is the product of 2 raised to the power of the value specified in the lock table entry characteristic (LTEX). Valid sizes are from 1 byte to the maximum lock table entry size in powers of 2.

This operand is ignored when the lock indicator (LI) in the list structure type (LST) is zero.

Lock Table Entry Count (LTEC)

A four-byte unsigned binary integer that specifies the number of lock table entries to be allocated. Valid counts are from 1 to $2^{32}-1$.

This operand is ignored when the lock indicator (LI) in the list structure type (LST) is zero.

Marginal Structure Size (MRSS)

A four-byte unsigned binary integer that specifies the minimum number of 4K-byte units of CF storage that are required for the creation of the requested lock table entries, lists, and associated controls for the list structure, independent of either the storage increment size or the requested target entry-to-element ratio (TETELR).

Maximum Data List Entry Size (MDLES)

An eight-bit binary value that specifies the maximum size of the data list entry as an integral multiple of the list element size. Valid values range from 0 to the smaller of the two numbers: 255 and $256/2^{LELX}$, where LELX is the list element characteristic. The value must be zero when the data indicator (DI) in the list structure type (LST) operand is zero and must be nonzero when the data indicator (DI) is one.

Maximum Structure Size (MXSS)

A four-byte unsigned binary integer that specifies the maximum number of 4,096-byte units allocated. Valid sizes are from the smallest number of 4,096-byte units sufficient for creating the requested lock table entries, lists, associated controls, and at least one list entry when a list set is requested to a maximum of $2^{44}-4,096$ bytes. When the target structure size (TSS) is zero, zero is also a valid value.

Minimum Apportionable Structure Size (MASS)

A four-byte unsigned binary integer that specifies the minimum number of 4K-byte units of CF storage that can be allocated for the list, in integral multiples of the CF storage increment, that are sufficient for creating the requested lock table entries, lists, associated controls, enough event monitor controls and list entries with their associated controls to substantially satisfy the target monitor-to-entry storage ratio (TMTESR), and enough entries and elements to substantially satisfy the target entry-to-element ratio (TETELR).

As noted above, the TMTESR is discussed further in the commonly owned, copending application of D. J. Dahlen et al., Ser. No. 08/698,142, entitled "Monitoring and Notification for Central Processors of Subsidiary List Transitions in an External Storage Structure," filed Aug. 15, 1996, incorporated herein by reference.

Minimum Required Control Storage (MRCS)

A four-byte unsigned binary integer that specifies the minimum number of 4K-byte units that must be allocated from control storage.

Target Entry-to-Element Ratio (TETELR)

A four-byte field consisting of two two-byte unsigned binary integers that specify the target for the relative number of list entries to list elements possible in the list set. The first two bytes contain the first number and the second two bytes contain the second number.

The first number divided by the sum of the two numbers represents the fraction of the total of the maximum list set element count and the maximum list set entry count that consists of list entries.

The second number divided by the sum of the two numbers represents the fraction of the total of the maximum list set element count and the maximum list set entry count that consists of list elements that are available for assignment to list entries or retry data blocks, or both, in the list set.

This operand is ignored unless the target structure size (TSS) operand is nonzero.

If the target structure size (TSS) is nonzero, the second number of TETELR must be zero if the data indicator (DI) in the list structure type (LST) operand is zero. If TSS is nonzero and the data indicator (DI) is one, both numbers must be nonzero. The second number divided by the first number must not exceed the maximum data list entry size (MDLES).

Target Maximum Element Count (TMELC)

A four-byte unsigned binary integer that specifies the target for the maximum number of list elements that are available for assignment to list entries or retry data blocks, or both, in the list set.

The value of the target list set element count divided by the value of the target list set entry count cannot exceed the maximum data list entry size (MDLES). This operand is ignored unless the target structure size (TSS) is zero and the data indicator (DI) in the list structure type (LST) is one.

Target Maximum Entry Count (TMEC)

A four-byte unsigned binary integer that specifies the target for the maximum number of possible list entries in a list set. The value of the target list set element count divided by the value of the target list set entry count cannot exceed the maximum data list entry size.

This operand is ignored unless the target structure size (TSS) is zero and either the data indicator (DI) or the adjunct indicator (AI) in the list structure type (LST) is one.

Target Maximum Event Monitor Count (TMEMC)

A four-byte unsigned binary integer that specifies the target for the maximum number of event monitor controls objects that are available for registration of interest in subsidiary lists within the list set.

This operand is ignored unless the target structure size (TSS) is zero, the key indicator (KI) in the list structure type (LST) is one, and either the data indicator (DI) or adjunct indicator (AI) is one.

The TMEMC is discussed further in the commonly owned, copending application of D. J. Dahlen et al., Ser. No. 08/698,142, entitled "Monitoring and Notification for Central Processors of Subsidiary List Transitions in an External Storage Structure," filed Aug. 15, 1996, incorporated herein by reference.

Target Monitor-to-Entry Storage Ratio (TMTESR)

A four-byte field consisting of two two-byte unsigned binary integers that specify the target for the relative amount of storage available for event monitor controls versus list entries and their associated controls. The first two bytes contain the first number and the second two bytes contain the second number.

The first number divided by the sum of the two numbers represents the fraction of the target structure size (TSS) less the marginal structure size (MRSS) that is dedicated to event monitor controls. The second number divided by the sum of the two numbers represents the fraction of the target structure size (TSS) less the marginal structure size (MRSS) that is dedicated to list entries and their associated controls. When the first number is zero, the second number is assumed to be 100. This operand is ignored unless the target structure size (TSS) is nonzero, the key indicator (KI) in the list structure type (LST) is one, and either the data indicator (DI) or adjunct indicator (AI) is one.

Target Structure Size (TSS)

A four-byte unsigned binary integer that, when nonzero, specifies the number of 4K-byte units to be allocated. When the target structure size (TSS) is zero, the number of 4K-byte units to be allocated is computed based on the values of the specified target maximum entry count (TMEC), the target maximum element count (TMELC), and the target maximum event monitor count (TMEMC) values. The computed number is placed in the target structure size (TSS) response operand.

Referring also to FIG. 19, the Compute List Structure Parameters (CLSP) command has the following message command block (MCB) format:

| Bytes | Request Operand | | Acronym |
|---|---|---|---|
| 0–15 | Message header | | |
| 16–17 | Command code | | CC |
| 18–20 | Reserved (zeros) | | |
| 21 | Bit | Description | |
| | 0 | Reserved (zeros) | |
| | 1–7 | List structure type | LST |

| Bytes | Request Operand | Acronym |
|---|---|---|
| 22 | Lock table entry characteristic | LTEX |
| 23 | List element characteristic | LELX |
| 24 | Maximum data list entry size | MDLES |
| 25–27 | Reserved (zeros) | |
| 28–31 | Target entry-to-element ratio | TETELR |
| 32–35 | Lock table entry count | LTEC |
| 36–39 | List count | LC |
| 40–43 | Target structure size | TSS |
| 44–47 | Maximum structure size | MXSS |
| 48–51 | Target monitor-to-entry storage ratio | TMTESR |
| 52–135 | Reserved (zeros) | |
| 136–139 | Target maximum element count | TMELC |
| 140–143 | Target maximum entry count | TMEC |
| 144–147 | Target maximum event monitor count | TMEMC |
| 148–255 | Reserved (zeros) | |

FIG. 16 shows the processing of a CLSP command by the coupling facility. The type of processing depends on the value of the target structure size (TSS) operand supplied in the MCB 112 (indicated in FIG. 16 as "MCB.TSS"), as determined at step 1602.

If the target structure size (TSS) request operand is zero, then the target maximum element count (TMELC), the target maximum entry count (TMEC), the target maximum event monitor count (TMEMC), the lock table entry count (LTEC), the list structure type (LST), the lock table entry characteristic (LTEX), the list element characteristic (LELX), the maximum data list entry size (MDLES), the list count (LC) and, optionally, the maximum structure size (MXSS) are input values for the computation. The list structure initial allocation process is invoked with these inputs, but no structure is created. The CF 16 computes the target ratio(s), in this case the target entry-to-element ratio (TETELR) and the target monitor-to-entry storage ratio (TMTESR)(step 1604), and computes the marginal structure size (MRSS), the minimum apportionable structure size (MASS), the minimum required control storage (MRCS) and the target structure size (TSS) on the assumption that MXSS is equal to TSS (step 1606).

The target structure size (TSS), the minimum apportionable structure size (MASS), and the marginal structure size (MRSS) are calculated according to the rules for updating the corresponding objects. The target entry-to-element ratio (TETELR) and the target monitor-to-entry storage ratio (TMTESR) are computed following the rules for updating the pending ratios. The minimum required control storage (MRCS) is the amount of control storage that would be minimally required to create the structure with the computed target structure size (TSS).

If the supplied maximum structure size (MXSS) request operand ("MCB.MXSS") is zero (step 1608), then MXSS is set equal to the computed target structure size (TSS) (step 1610). If at step 1608 the supplied maximum structure size (MXSS) request operand is greater than zero, then it is compared with the computed target structure size (TSS) (step 1612). If the supplied maximum structure size (MXSS) is less than or equal to the computed target structure size (TSS), then the procedure branches to step 1610, and MXSS is set equal to the computed TSS.

If at step 1612 the supplied maximum structure size (MXSS) is greater than the computed target structure size (TSS), then the supplied MXSS value becomes an additional input to the computation, that is, MXSS is set equal to the supplied MXSS operand (step 1614), and MRSS, MASS, MRCS and TSS are recomputed using that value (step 1616).

Following step 1610 or 1616, the computed ratio(s) (in this case TETELR and TMTESR) and the computed values MRSS, MASS, MRCS, TSS and MXSS are placed in the message response block (MRB) 114, along with the target counts (in this case TMELC, TMEC and TMEMC) (step 1618), and a response code (RC) of zero is returned (step 1620).

If at step 1602 the target structure size (TSS) request operand is greater than zero, the target structure size (TSS), the maximum structure size (MXSS), the target entry-to-element ratio (TETELR), the target monitor-to-entry storage ratio (TMTESR), the lock table entry count (LTEC), the list structure type (LST), the lock table entry characteristic (LTEX), the list element characteristic (LELX), the maximum data list entry size (MDLES), and the list count (LC) are input values for the computation. The list structure initial allocation process is invoked with these inputs, but no structure is created.

The minimum apportionable structure size (MASS) and marginal structure size (MRSS) are then computed according to the rules for updating the corresponding objects (FIG. 8) (step 1622).

If the target structure size (TSS) request operand is invalid, that is, either smaller than the marginal structure size (MRSS) or larger than the maximum structure size (MXSS) (step 1624), the minimum apportionable structure size (MASS) and the marginal structure size (MRSS) are placed in the message response block (MRB) 114 (step 1626) and a response code (RC) of 3 is returned (step 1628).

If at step 1624 the target structure size (TSS) is valid, that is, neither smaller than the marginal structure size (MRSS) nor larger than the maximum structure size (MXSS), then the target counts (in this case, TMELC, TMEC and TMEMC) and MRCS are computed (step 1630); the target counts are computed according to the rules for updating the corresponding objects. The computed target counts, MRSS, MASS and MRCS are placed in the message response block (MRB) 114, along with TSS, MXSS and the ratios TETELR and TMTESR (step 1632), and a response code (RC) of zero is returned (step 1620).

Request Exceptions

When a request exception is recognized, an exception code (EC) is written in bytes 30 and 31 of the message response block (MRB). Command execution is suppressed and bit 4 in the SC operand is set to one.

Response Codes

| RC | Description | Priority |
|---|---|---|
| 0 | Allocation parameters returned | 7 |
| 1–2 | Reserved | |
| 3 | Invalid target structure size (TSS) | 6.M |
| 4 | Computed value exceeds $2^{32} - 1$ | 7 |
| 5–253 | Reserved | |
| 254 | Command execution suppressed | |
| | SC    Description | |
| | 0    Facility paused | 1.A.2 |
| | 1    Inactive path | 1.A.3 |
| | 4    Request exception | 6.D |
| | 5    Incorrect facility state | 6.E |
| | 15   Path not available | 1.A.1 |
| | 23   Facility damage | 4 |
| 255 | Command execution terminated | |
| | SC    Description | |
| | 23   Facility damage | 2 |

Referring also to FIG. 20, the response format when the response code (RC) is 0 is:

| Bytes | Response Operand | Acronym |
|---|---|---|
| 0–15 | Response descriptor | |
| 16 | Response code | RC |
| 17–35 | Reserved (zeros) | |
| 36–39 | Maximum structure size | MXSS |
| 40–43 | Minimum apportionable structure size | MASS |
| 44–47 | Marginal structure size | MRSS |
| 48–51 | Target structure size | TSS |
| 52–55 | Target maximum entry count | TMEC |
| 56–59 | Target maximum element count | TMELC |
| 60–63 | Target maximum event monitor count | TMEMC |
| 64–67 | Target entry-to-element ratio | TETELR |
| 68–71 | Target monitor-to-entry storage ratio | TMTESR |
| 72–75 | Minimum required control storage | MRCS |
| 76–255 | Reserved (zeros) | |

Referring also to FIG. 21, the response format when the response code (RC) is 3 is:

| Bytes | Response Operand | Acronym |
|---|---|---|
| 0–15 | Response descriptor | |
| 16 | Response code | RC |
| 17–39 | Reserved (zeros) | |
| 40–43 | Minimum apportionable structure size | MASS |
| 44–47 | Marginal structure size | MRSS |
| 48–255 | Reserved (zeros) | |

Similarly, the response format when the response code (RC) is 4 is:

| Bytes | Response Operand | Acronym |
|---|---|---|
| 0–15 | Response descriptor | |
| 16 | Response code | RC |
| 17–255 | Reserved (zeros) | |

The response format when the response code (RC) is 254 or 255 is shown in Table 1 above.

The request and response operands for the CLSP command are list operands which are defined above. The command is defined as a global command since no valid SID is provided. The CLSP command invokes list processes but does not address any specific list structure.

Physical storage limitations in the coupling facility do not affect the calculations, which are based on internal list allocation algorithms and fixed attributes of the coupling facility such as the storage increment size. Thus the computed allocation parameters describe an idealized list structure and there is no assurance that the structure can be created in the facility.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

Appendix

Creating a Cache Structure

When the cache structure is created and the target structure size is zero, the target data area element count and the adjunct assignment indicator determine the attributes of the created structure. When the target data area element count is zero, no data area elements or adjunct area elements are created; the cache is a directory-only cache. When the target data area element count is nonzero and the adjunct assignment indicator is one, an adjunct area is assigned to the directory entry. When the target data area element count is nonzero and the adjunct assignment indicator is zero, no adjunct areas are created.

When the cache structure is created and the target structure size is nonzero, the target directory-to-data ratio and the adjunct assignment indicator determine the attributes of the created structure. When the second number of the target directory-to-data ratio is zero, no data area elements or adjunct area elements are created; the cache is a directory-only cache. When the second number of the target directory-to-data ratio is nonzero and the adjunct assignment indicator is one, an adjunct area is assigned to the directory entry. When the second number of the target directory-to-data ratio is nonzero and the adjunct assignment indicator is zero, no adjunct areas are created.

When a cache structure is created, (1) the created bit in the structure identifier vector associated with the SID value is set to one, and (2) the cache structure controls are initialized. This includes the following:

1. Initializing the LCID vector to zero.
2. Placing the SAU operand in the structure authority,
3. Placing the USC operand in the user structure control, Setting the adjunct assignment indicator equal to the value of the AAI operand,
4. Placing the MCC operand in the maximum castout class object, Placing the MSC operand in the maximum storage class object,
5. Placing the DAEX operand in the data area element characteristic object,
6. Placing the MDAS operand in the maximum data area size object,
7. Placing the TDTDR operand in the pending directory-to-data ratio object,
8. Updating the pending directory-to-data ratio,
9. Updating the target structure size object and the target count objects,
10. Updating the structure size, maximum structure size, marginal structure size, and minimum apportionable structure size objects.
11. Updating the free space and free control space objects.

When a cache structure is created and the maximum structure size request operand is nonzero, the maximum structure size object is initialized to the largest storage size that the model can support given the structure size and is equal to or smaller than the maximum structure size request operand rounded up to the nearest integral multiple of the cf storage increment.

When a cache structure is created, the target structure size request operand is zero, and the maximum structure size request operand is zero, the maximum structure size object is set equal to the computed target structure size Specifying a nonzero target structure size which is smaller than the marginal structure size or larger than the maximum structure size will cause the allocation to complete with a response code 3.

The Allocate Cache Structure (ACS) command has the following MCB format:

| Bytes | Request Operand | Acronym |
|---|---|---|
| 0–15 | Message header | |
| 16–17 | Command code | CC |
| 18–19 | Structure identifier | SID |
| 20 | Bit Description | |
| | 0 Adjunct assignment indicator | AAI |
| | 1 Apportionment priority ind. | API |
| | 2 UDF order queue indicator | UDFOQI |
| | 3–4 Reserved (zeros) | |
| | 5–7 Allocation type | AT |
| 21 | Maximum data area size | MDAS |
| 22 | Data toleration factor | DTF |
| 23 | Directory toleration factor | DITF |
| 24–27 | Target structure size | TSS |
| 28–31 | Maximum structure size | MXSS |
| 32–63 | User structure control | USC |
| 64–79 | Structure authority | SAU |
| 80–95 | Comparative structure authority | CSAU |
| 96 | Data area element characteristic | DAEX |
| 97 | Maximum storage class | MSC |
| 98–99 | Maximum castout class | MCC |
| 100–103 | Target directory-to-data ratio | TDTDR |
| 104–107 | Target directory entry count | TGDEC |
| 108–111 | Target data area element count | TGDAEC |
| 112 | Bit Description | |
| | 0 Target counts priority ind. | TCPI |
| | 1 Target ratio validity ind. | TRVI |
| | 2–7 Reserved (zeros) | |
| 113–127 | Reserved (zeros) | |
| 128–159 | Extended user structure control | EUSC |
| 160–255 | Reserved (zeros) | |

The allocate cache structure command updates the user structure control and the extended user structure control with the values of the user structure control and extended user structure control request operands respectively, when (1) a cache structure is created or (2) the initial allocation process is complete, the structure authority comparison is successful, and the user structure control indicator in the allocation type request operand is one.

The allocate cache structure command creates a cache structure when (1) the specified created bit of the structure identifier vector is zero, (2) the structure authority comparison succeeds, (3) the target structure size operand is zero or is sufficient for creating the associated controls, (4) the target structure size operand is less than or equal to the maximum structure size operand, (5) there is sufficient storage available to create a cache structure of a marginal size, and (6) when the target structure size request operand is zero and the target count priority indicator is one, there are sufficient resources to achieve the specified target counts.

When a cache structure is created, the pending directory-to-data ratio is updated.

The allocate cache structure command continues the initial allocation of a cache structure when (1) the specified created bit of the structure identifier vector is one, (2) the structure authority comparison succeeds, and (3) initial allocation of the structure has not been completed.

The allocate cache structure command initiates or continues expansion of a cache structure when (1) initial allocation of the structure has been completed, (2) the structure authority comparison succeeds, (3) the structure size indicator is one, and (4) the specified target structure size is greater than or equal to the value of the structure size object.

The allocate cache structure command initiates or continues contraction of a cache structure when (1) initial allocation of the structure has been completed, (2) the structure authority comparison succeeds, (3) the structure size indicator is one, and (4) the specified target structure size is smaller than the value of the structure size object.

When expansion or contraction is initiated or continued, the structure size change indicator is set to one in the cache structure controls and all reclaiming vectors are set to the inactive state.

The allocate cache structure command initiates reapportionment of a cache structure when (1) initial allocation of the structure has been completed, (2) the structure authority comparison succeeds, (3) the ratio indicator is one, and (4) the TDTDR request operand and the PDTDR object are not equal.

The allocate cache structure command continues reapportionment of a cache structure when (1) initial allocation of the structure has been completed, (2) the structure authority comparison succeeds, (3) the ratio indicator is one, (4) the TDTDR request operand and the PDTDR object are equal, and (5) the target directory-to-data ratio results in target counts such that the ratio of the target directory entry count to the target data area element count differs from the ratio of the total directory entry count to the total data area element count.

When reapportionment is initiated or continued, the reapportionment-in-progress indicator is set to one, all reclaiming vectors are set to the inactive state, and the pending directory-to-data ratio is set to the value of the TDTDR request operand updated.

The allocate cache structure command resumes reapportionment of a cache structure when (1) initial allocation of the structure has been completed, (2) the structure authority comparison succeeds, (3) the structure size indicator is one, (4) the ratio indicator is zero, and (5) the pending directory-to-data ratio results in target counts such that the ratio of the target directory entry count to the target data area element count differs from the ratio of the total directory entry count to the total data area element count.

When reapportionment is resumed, the reapportionment-in-progress indicator is set to one and all reclaiming vectors are set to the inactive state.

The cache structure processes are checkpointed and stopped at the established checkpoint when (1) initial allocation of the structure has been completed, (2) the structure authority comparison succeeds, and (3) the allocation type is zero. When (1) the requested cache structure processes are completed, all the processes are checkpointed, and the reapportionment-in-progress and structure size change indicators are set to zero in the cache structure controls, or (2) the user structure control is updated, or both, then the total directory entry count, total data area element count, maximum structure size, minimum apportionable structure size, marginal structure size, structure size, target structure size, target directory entry count, target data area element count, structure size change indicator, and response code 0 are returned in the response operands.

When a model-dependent time period has elapsed before the allocation processes are completed, the processes are checkpointed, and the total directory entry count, total data area element count, maximum structure size, minimum apportionable structure size, marginal structure size, structure size, reapportionment-in-progress indicator, structure size change indictor, target structure size, target directory entry count, target data area element count, and response code I are returned in the response operands.

When the structure authority comparison fails, the structure authority, the user structure control, and response code 2 are returned in the response operands.

When the cache structure does not exist and the target structure size is nonzero and is (1) insufficient to allow for the creation of the associated controls, or (2) larger than the maximum structure size request operand, or (3) the target structure size is zero, the maximum structure size is nonzero, and the computed target structure size is larger than the maximum structure size, the minimum apportionable structure size, marginal structure size, and response code 3 are returned to the program.

Creating a List Structure

When a list structure is created, the list structure type determines the attributes of the created structure. The list structure type has indicators for each of the following: counters, locks, data, adjunct, name, and key.

When the element count indicator in the list structure type specified is zero and allocation is successful, the list controls for each list contain a list entry count and a list entry count limit.

When the count indicator in the list structure type specified is one and allocation is successful, the list controls for each list contain a list element count and a list element count limit.

When the lock indicator in the list structure type specified is one and allocation is successful, a lock table is created with a width as specified by the lock table entry characteristic and a length as specified by the lock table entry count.

When the data indicator in the list structure type specified is one and allocation is successful, storage is allocated for the creation of list elements. The size of the list elements is specified by the list element characteristic.

When the adjunct indicator in the list structure type specified is one and allocation is successful, each list entry created in the structure has an adjunct list entry with a size of 64 bytes.

When the name indicator in the list structure type specified is one and allocation is successful, each list entry created in the structure has a list entry name associated with it.

When the key indicator in the list structure type specified is one and allocation is successful, every user identifier has event queue controls associated with it and each list entry created in the structure has a list entry key associated with it.

When a list structure is created, (1) the free space and free control space global controls are updated, (2) the appropriate created bit in the structure identifier vector is set to one, and (3) the list structure and list controls are initialized, including the update of the target structure size and target count objects.

When a list structure is created and the maximum structure size request operand is nonzero, the maximum structure size object is initialized to the largest storage size that the model can support given the structure size and is equal to or smaller than the maximum structure size request operand rounded up to the nearest integral multiple of the of storage increment.

When a list structure is created, target structure size request operand is zero, and the maximum structure size request operand is zero, the maximum structure size object is set equal to the computed target structure size.

Specifying a nonzero target structure size which is smaller than the marginal structure size or larger than the maximum structure size will cause the allocation to complete with a response code 3.

The Allocate List Structure (ALST) command has the following MCB format:

| Bytes | Request Operand | Acronym |
| --- | --- | --- |
| 0–15 | Message header | |
| 16–17 | Command code | CC |
| 18–19 | Structure identifier | SID |
| 20 | Bit  Description | |
| | 0   Target counts priority ind. | TCPI |
| | 1   Apportionment priority ind. | API |
| | 2   Target ratio validity ind. | TRVI |
| | 3–7  Reserved | |
| 21 | Bit  Description | |
| | 0–1  Reserved (zeros) | |
| | 2–7  List structure type | LST |
| 22 | Lock table entry characteristic | LTEX |
| 23 | List element characteristic | LELX |
| 24 | Maximum data list entry size | MDLES |
| 25 | Bit  Description | |
| | 0–3  Reserved (zeros) | |
| | 4–7  Allocation type | AT |
| 26 | Element toleration factor | ELTF |
| 27 | Entry toleration factor | ETF |
| 28–31 | Target entry-to-element ratio | TETELR |
| 32–35 | Lock table entry count | LTEC |
| 36–39 | List count | LC |
| 40–43 | Target structure size | TSS |
| 44–47 | Maximum structure size | MXSS |
| 48–51 | Target monitor-to-entry storage ratio | TMTESR |
| 52–63 | Reserved (zeros) | |
| 64–79 | Comparative structure authority | CSAU |
| 80–95 | Structure authority | SAU |
| 96–127 | User structure control | USC |
| 128–130 | Reserved (zeros) | |
| 131 | Event monitor toleration factor | EMTF |
| 132–135 | Reserved (zeros) | |
| 136–139 | Target maximum element count | TMELC |
| 140–143 | Target maximum entry count | TMEC |
| 144–147 | Target maximum event monitor count | TMEMC |
| 148–159 | Reserved (zeros) | |
| 160–191 | Extended user structure control | EUSC |
| 192–255 | Reserved (zeros) | |

The user structure control and the extended user structure control are updated when (1) a list structure is created or (2) the initial allocation process is complete, the structure authority comparison is successful, and the user structure control indicator in the allocation-type request operand is one.

The allocate list structure command creates a list structure when (1) the specified created bit of the structure identifier vector is zero, (2) the structure authority comparison succeeds, (3) the target structure size operand is zero or is sufficient for creating the requested lock table entries, lists and associated controls, (4) the target structure size operand is less than or equal to the maximum structure size operand, (5) there is sufficient storage available to create a list structure of a marginal size, and (6) when the target structure size request operand is zero and the target count priority indicator is one, there are sufficient resources to achieve the specified target counts. When a list structure is created, the pending entry-to-element ratio and the pending monitor-to-entry storage ratio are updated.

The allocate list structure command continues the initial allocation of a list structure when (1) the specified created bit of the structure identifier vector is one, (2) the structure authority comparison succeeds, and (3) initial allocation of the structure has not completed. The allocate list structure command initiates or continues expansion of a list structure when (1) initial allocation of the structure has been completed, (2) the structure authority comparison succeeds, (3) the structure size indicator is one, and (4) the specified target structure size is greater than or equal to the value of the structure size object.

The allocate list structure command initiates or continues contraction of a list structure when (1) initial allocation of the structure has been completed, (2) the structure authority comparison succeeds, (3) the structure size indicator is one, and (4) the specified target structure size is smaller than the value of the structure size object.

When expansion or contraction is initiated or continued, the structure size change indicator is set to one in the list structure controls. The allocate list structure command initiates entry-to-element reapportionment of a list structure when (1) initial allocation of the structure has been completed, (2) the structure authority comparison succeeds, (3) the entry-to-element ratio indicator is one, and (4) the TETELR request operand and the PETELR object are not equal.

The allocate list structure command continues entry-to-element reapportionment of a list structure when (1) initial allocation of the structure has been completed, (2) the structure authority comparison succeeds, (3) the entry-to-element ratio indicator is one, (4) the TETELR request operand and the PETELR object are equal, and (5) the target entry-to-element ratio results in target counts where the ratio of the target maximum entry count to the target maximum element count differs from the ratio of the maximum list set entry count to the maximum list set element count.

When entry-to-element reapportionment is initiated or continued, the entry reapportionment-in-progress indicator is set to one and the pending entry-to-element ratio is updated.

The allocate list structure command resumes entry-to-element reapportionment of a list structure when (1) initial allocation of the structure has been completed, (2) the structure authority comparison succeeds, (3) the structure size indicator is one, or the monitor-to-entry storage ratio indicator, or both, are ones, (4) the entry-to-element ratio indicator is zero, and (5) the pending entry-to-element ratio results in target counts where the ratio of the target maximum entry count to the target maximum element count differs from the ratio of the maximum list set entry count to the maximum list set element count.

When entry-to-element reapportionment is resumed, the entry reapportionment-in-progress indicator is set to one.

The allocate list structure command initiates monitor-to-entry storage reapportionment of a list structure when (1) initial allocation of the structure has been completed, (2) the structure authority comparison succeeds, (3) the monitor-to-entry storage ratio indicator is one, and (4) the TMTESR request operand and the PMTESR object are not equal. The allocate list structure command continues monitor-to-entry storage reapportionment of a list structure when (1) initial allocation of the structure has been completed, (2) the structure authority comparison succeeds, (3) the monitor-to-entry storage ratio indicator is one, (4) the TMTESR request operand and the PMTESR object are equal, and (5) the target monitor-to-entry storage ratio differs from the ratio of storage for event monitor controls to storage for list entries and their associated controls.

When monitor-to-entry storage reapportionment is initiated or continued, the monitor reapportionment-in-progress indicator is set to one and the pending monitor-to-entry storage ratio is updated.

The allocate list structure command resumes monitor-to-entry storage reapportionment of a list structure when (1) initial allocation of the structure has been completed, (2) the structure authority comparison succeeds, (3) the structure size indicator or the entry-to-element ratio indicator, or both, are ones, (4) the monitor-to-entry storage ratio indicator is zero, and (5) the pending monitor-to-entry storage ratio differs from the ratio of storage for event monitor controls to storage for list entries and their associated controls.

When monitor-to-entry-storage reapportionment is resumed, the monitor reapportionment-in-progress indicator is set to one.

The list structure processes are checkpointed and stopped at the established checkpoint when (1) initial allocation of the structure has been completed, (2) the structure authority comparison succeeds, and (3) the allocation type is zero.

When (1) the allocation processes are completed all the allocation processes are checkpointed, the entry reapportionment-in-progress, monitor reapportionment-in-progress, and structure size change indicators are set to zero in the list structure controls, or (2) the user structure control is updated, or both, then the maximum event monitor controls count, maximum list set entry count, maximum list set element count, maximum structure size, minimum apportionable structure size, marginal structure size, structure size, target maximum event monitor count, target structure size, target maximum entry count, target maximum element count, and response code 0 are returned in the response operands.

When a model-dependent time period has elapsed before the allocation processes are completed, the processes are checkpointed, and the maximum event monitor controls count, maximum list set entry count, maximum list set element count, maximum structure size, minimum apportionable structure size, marginal structure size, structure size, entry reapportionment-in-progress indicator, monitor reapportionment-in-progress indicator, structure size change indicator, target structure size, target maximum entry count, target maximum element count, and response code 1 are returned in the response operands.

When the structure authority comparison fails, the structure authority, the user structure control, and response code 2 are returned in the response operands.

When the list structure does not exist and the target structure size is nonzero and is (1) insufficient to allow for the creation of the requested lock table entries, lists, and associated controls, or (2) larger than the maximum structure size request operand, or (3) the target structure size is zero, the maximum structure size is nonzero, and the computed target structure size is larger than the maximum structure size, the minimum apportionable structure size, marginal structure size, and response code 3 are returned to the program.

What is claimed is:

1. In an information handling system in which a request handler is operable to assign storage to a data structure in accordance with storage allocation parameters contained in a request received from a requester, a method of previewing the results of an assignment to storage to a data structure, comprising the steps of:

receiving from a requester a request containing a set of one or more independent storage allocation parameters defining an assignment of storage to a data structure, the data structure defined by the set of independent storage allocation parameters also having a set of one or more dependent storage allocation parameters that define the assignment of storage to the data structure and are dependent on the independent storage allocation parameters;

determining, without actually assigning storage to a data structure, the dependent storage allocation parameters of a data structure defined by the independent storage allocation parameters; and returning the dependent storage allocation parameters to the requester.

2. The method of claim 1 in which the data structure comprises a list structure.

3. The method of claim 1 in which the data structure comprises a cache structure.

4. The method of claim 1 in which the set of dependent storage allocation parameters comprises a target structure size.

5. The method of claim 4 in which the set of independent storage allocation parameters comprises a target entry count.

6. The method of claim 4 in which the set of independent storage allocation parameters comprises a target element count.

7. The method of claim 1 in which the set of independent storage allocation parameters comprises a target structure size.

8. The method of claim 7 in which the set of dependent storage allocation parameters comprises a target entry count.

9. The method of claim 7 in which the set of dependent storage allocation parameters comprises a target element count.

10. The method of claim 7 in which the determining step comprises the step of determining whether the target structure size is within a predetermined valid range.

11. In an information handling system in which a request handler is operable to assign storage to a data structure in accordance with storage allocation parameters contained in a request received from a requester, apparatus for previewing the results of an assignment of storage to a data structure, comprising:

means for receiving from a requester a request containing a set of one or more independent storage allocation parameters defining an assignment of storage to a data structure, the data structure defined by the set of independent storage allocation parameters also having a set of one or more dependent storage allocation parameters that define the assignment of storage to the data structure and are dependent on the independent storage allocation parameters;

means for determining, without actually assigning storage to a data structure, the dependent storage allocation parameters of a data structure defined by the independent storage allocation parameters; and means for returning the dependent storage allocation parameters to the requester.

12. The apparatus of claim 11 in which the data structure comprises a list structure.

13. The apparatus of claim 11 in which the data structure comprises a cache structure.

14. The apparatus of claim 11 in which the set of dependent storage allocation parameters comprises a target structure size.

15. The apparatus of claim 14 in which the set of independent storage allocation parameters comprises a target entry count.

16. The apparatus of claim 14 in which the set of independent storage allocation parameters comprises a target element count.

17. The apparatus of claim 11 in which the set of independent storage allocation parameters comprises a target structure size.

18. The apparatus of claim 17 in which the set of dependent storage allocation parameters comprises a target entry count.

19. The apparatus of claim 17 in which the set of dependent storage allocation parameters comprises a target element count.

20. The apparatus of claim 17 in which the determining means comprises means for determining whether the target structure size is within a predetermined valid range.

* * * * *